United States Patent [19]

Serikawa et al.

[11] Patent Number: 6,028,845
[45] Date of Patent: Feb. 22, 2000

[54] COMMUNICATION-LINE-QUALITY MEASURING SYSTEM USING A CONVENTIONAL SIGNAL FRAME STRUCTURE

[75] Inventors: Atsuo Serikawa; Yasuhiro Saito; Yuji Maeda, all of Tokyo; Satoshi Kasuya, Nagoya, all of Japan

[73] Assignee: Fujitsu Limited, Kanagawa, Japan

[21] Appl. No.: 08/754,183

[22] Filed: Nov. 22, 1996

[30] Foreign Application Priority Data

Feb. 21, 1996 [JP] Japan ..................................... 8-033258

[51] Int. Cl.[7] .............................. G08C 15/00; H04J 3/24; H04J 3/06; H04L 7/00
[52] U.S. Cl. .......................... 370/249; 370/250; 370/474; 370/514; 375/368; 714/704; 714/716
[58] Field of Search .................................... 370/249, 339, 370/332, 333, 470, 471, 474, 250, 514; 375/219, 229, 340, 365, 368; 455/436, 525, 135; 348/6, 7, 8, 10, 11, 12, 13, 17, 19; 714/704, 712, 715, 716

[56] References Cited

U.S. PATENT DOCUMENTS

| 3,582,879 | 6/1971 | Sullivan ................................... 714/746 |
| 4,168,469 | 9/1979 | Parikh et al. ............................ 375/365 |
| 4,365,330 | 12/1982 | Chopping et al. ....................... 370/514 |
| 4,745,622 | 5/1988 | Gupta ....................................... 375/232 |
| 5,333,148 | 7/1994 | Tsubaki et al. .......................... 375/229 |
| 5,383,221 | 1/1995 | Akita et al. .............................. 375/219 |
| 5,638,384 | 6/1997 | Hayashi et al. .......................... 714/758 |
| 5,757,804 | 5/1998 | McGee ..................................... 370/514 |
| 5,886,999 | 3/1999 | Kojima et al. ............................ 371/5.5 |

Primary Examiner—Alpus H. Hsu
Assistant Examiner—Afsar M. Qureshi
Attorney, Agent, or Firm—Helfgott, Karas, PC.

[57] ABSTRACT

A communication-line-quality measuring system includes transmission and terminal equipment. Transmission equipment has a first frame assembling part transmitting a down-link multiplexed frame signal to a down-link line having a first frequency, and a first frame disassembling part disassembling an up-link multiplexed frame signal transmitted through an up-link line having a second frequency. Terminal equipment has a second frame disassembling part disassembling the down-link multiplexed frame signal, and a second frame assembling part transmitting the up-link multiplexed frame signal obtained by frame-multiplexing an output signal of the subscriber unit with a control signal, to the up-link line. A pattern generation part in the first frame assembling part provides a test signal to an available channel of signal frames in the down-link multiplexed frame signal. A loop-back part between the second frame disassembling part and the frame assembling part loops back the test signal derived from the down-link multiplexed frame signal in the second frame disassembling part to the second frame assembling part. The second frame assembling part provides the test signal in the up-link multiplexed frame signal to transmit to the transmission equipment. A comparing part in the transmission equipment compares the test signal in the up-link multiplexed frame signal, which is looped back by a control of the loop-back part, with a reference signal the same as the test signal generated in the pattern generation part.

50 Claims, 19 Drawing Sheets

FIG. 3 PRIOR ART

| TS No. \ Frame No. | MF/F | M CHANNEL / D CHANNEL | T | B CHANNEL | | | | | | | |
|---|---|---|---|---|---|---|---|---|---|---|---|
| | 00 | 01 — 02 — 32 | 33 | 34 | 35 | 36 | ~ | 124 | 125 | 126 | 127 |
| 00 | MF | M CHANNEL (1) | B0 | B1 | B2 | B3 | ~ | B91 | B92 | B93 | B94 |
| 01 | F | M CHANNEL (2) | B0 | B1 | B2 | B3 | ~ | B91 | B92 | B93 | B94 |
| 02 | F | M CHANNEL (3) | B0 | B1 | B2 | B3 | ~ | B91 | B92 | B93 | B94 |
| 03 | F | M CHANNEL (4) | B0 | B1 | B2 | B3 | ~ | B91 | B92 | B93 | B94 |
| 04 | F | M CHANNEL (5) | B0 | B1 | B2 | B3 | ~ | B91 | B92 | B93 | B94 |
| 05 | F | M CHANNEL (6) | B0 | B1 | B2 | B3 | ~ | B91 | B92 | B93 | B94 |
| 06 | F | M CHANNEL (7) | B0 | B1 | B2 | B3 | ~ | B91 | B92 | B93 | B94 |
| 07 | F | M CHANNEL (8) | B0 | B1 | B2 | B3 | ~ | B91 | B92 | B93 | B94 |
| 08 | F | D CHANNEL (1) | B0 | B1 | B2 | B3 | ~ | B91 | B92 | B93 | B94 |
| 09 | F | D CHANNEL (2) | B0 | B1 | B2 | B3 | ~ | B91 | B92 | B93 | B94 |
| ⋮ | ⋮ | ⋮ | ⋮ | ⋮ | ⋮ | ⋮ | ~ | ⋮ | ⋮ | ⋮ | ⋮ |
| 26 | F | D CHANNEL (19) | B0 | B1 | B2 | B3 | ~ | B91 | B92 | B93 | B94 |
| 27 | F | D CHANNEL (20) | B0 | B1 | B2 | B3 | ~ | B91 | B92 | B93 | B94 |
| 28 | F | D CHANNEL (21) | B0 | B1 | B2 | B3 | ~ | B91 | B92 | B93 | B94 |
| 29 | F | D CHANNEL (22) | B0 | B1 | B2 | B3 | ~ | B91 | B92 | B93 | B94 |
| 30 | F | D CHANNEL (23) | B0 | B1 | B2 | B3 | ~ | B91 | B92 | B93 | B94 |
| 31 | F | D CHANNEL (24) | B0 | B1 | B2 | B3 | ~ | B91 | B92 | B93 | B94 |

1 FRAME 125 μs
1 MULTI FRAME 4 ms

TS : TIMESLOT, 1 TIMESLOT = 8 BITS
MF : MULTIFRAME BIT
F : FRAME BIT

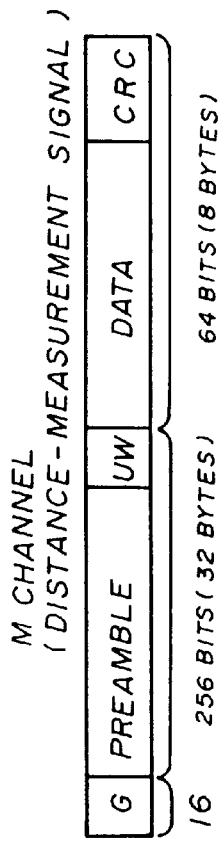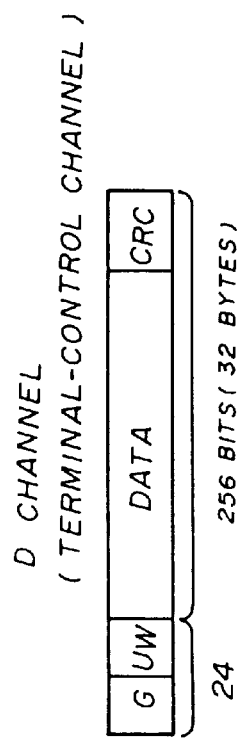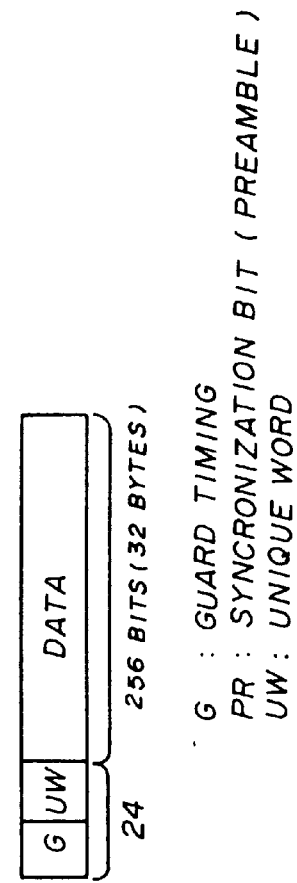
FIG.5A PRIOR ART
FIG.5B PRIOR ART
FIG.5C PRIOR ART

FIG.15

REGISTER READING

| ADDRESS | b15 | | | | | | | | | | | | | | | b0 | |
|---|---|---|---|---|---|---|---|---|---|---|---|---|---|---|---|---|---|
| An | | | | | | | | | | | | | | | | | F1 — 98 |
| An+2 | | | | | | | | | | | | | | | | | U1 — 99 |
| An+4 | | | | | | | | | | | | | | | | | B1 — 100 |
| An+6 | | | | | | | | | | | | | | | | | F2 — 101 |
| An+8 | | | | | | | | | | | | | | | | | U2 — 102 |
| An+A | | | | | | | | | | | | | | | | | B2 — 103 |

F1 : THE NUMBER OF RECEIVE FRAMES OF B93 CHANNEL
U1 : THE NUMBER OF UW UNDETECTIONS OF B93 CHANNEL
B1 : THE NUMBER OF BIT ERRORS OF B93 CHANNEL
F2 : THE NUMBER OF RECEIVE FRAMES OF B94 CHANNEL
U2 : THE NUMBER OF UW UNDETECTIONS OF B94 CHANNEL
B2 : THE NUMBER OF BIT ERRORS OF B94 CHANNEL

FIG.17

| TS NO. / FRAME No. | MF/F | | M CHANNEL /D CHANNEL | T | B CHANNEL | | | | | | | | |
|---|---|---|---|---|---|---|---|---|---|---|---|---|---|
| | 00 | 01 | 02      31 | 32 | 33 | 34 | 35 | 36 | ~ | 124 | 125 | 126 | 127 |
| 00 | MF | | M CHANNEL (1) | T0 | B0 | B1 | B2 | B3 | ~ | B91 | B92 | B93 | B94 |
| 01 | F | | M CHANNEL (2) | T0 | B0 | B1 | B2 | B3 | ~ | B91 | B92 | B93 | B94 |
| 02 | F | | M CHANNEL (3) | T0 | B0 | B1 | B2 | B3 | ~ | B91 | B92 | B93 | B94 |
| 03 | F | | M CHANNEL (4) | T0 | B0 | B1 | B2 | B3 | ~ | B91 | B92 | B93 | B94 |
| 04 | F | | M CHANNEL (5) | T0 | B0 | B1 | B2 | B3 | ~ | B91 | B92 | B93 | B94 |
| 05 | F | | M CHANNEL (6) | T0 | B0 | B1 | B2 | B3 | ~ | B91 | B92 | B93 | B94 |
| 06 | F | | M CHANNEL (7) | T0 | B0 | B1 | B2 | B3 | ~ | B91 | B92 | B93 | B94 |
| 07 | F | | M CHANNEL (8) | T0 | B0 | B1 | B2 | B3 | ~ | B91 | B92 | B93 | B94 |
| 08 | F | | D CHANNEL (1) | T0 | B0 | B1 | B2 | B3 | ~ | B91 | B92 | B93 | B94 |
| 09 | F | | D CHANNEL (2) | T0 | B0 | B1 | B2 | B3 | ~ | B91 | B92 | B93 | B94 |
| ⁝ | ⁝ | | ⁝ | ⁝ | ⁝ | ⁝ | ⁝ | ⁝ | ~ | ⁝ | ⁝ | ⁝ | ⁝ |
| 26 | F | | D CHANNEL (19) | T0 | B0 | B1 | B2 | B3 | ~ | B91 | B92 | B93 | B94 |
| 27 | F | | D CHANNEL (20) | T0 | B0 | B1 | B2 | B3 | ~ | B91 | B92 | B93 | B94 |
| 28 | F | | D CHANNEL (21) | T0 | B0 | B1 | B2 | B3 | ~ | B91 | B92 | B93 | B94 |
| 29 | F | | D CHANNEL (22) | T0 | B0 | B1 | B2 | B3 | ~ | B91 | B92 | B93 | B94 |
| 30 | F | | D CHANNEL (23) | T0 | B0 | B1 | B2 | B3 | ~ | B91 | B92 | B93 | B94 |
| 31 | F | | D CHANNEL (24) | T0 | B0 | B1 | B2 | B3 | ~ | B91 | B92 | B93 | B94 |

1 FRAME 125 μs

125

6,028,845

COMMUNICATION-LINE-QUALITY MEASURING SYSTEM USING A CONVENTIONAL SIGNAL FRAME STRUCTURE

BACKGROUND OF THE INVENTION

1. Field of the Invention

The present invention generally relates to a communication-line-quality measuring system, and more particularly, to a communication-line-quality measuring system used in a two-way community antenna television (CATV) system and a personal handyphone system (PHS) in Japan, etc.

In the two-way CATV system, line quality between an office such as a switching office and terminal equipment on a subscriber side is measured. In the PHS, line quality of a radio transmission line between a base station and a mobile station (a portable station) on a subscriber side is measured.

In the line-quality measurement, it is desired that the measurement be carried out without influencing an operation of the communication system.

2. Description of the Related Art

FIG. 1 shows a typical network configuration of a two-way CATV telephone service. In FIG. 1, an office for the CATV system has a switching system 10, a plurality of TDMA (time division multiple access) equipment 11, 11a, 11b, 11c, which are connected to the switching system 10, and broadcasting equipment 1.

The office further includes a two-way combining-and-distributing unit 2 connected with the TDMA equipment 11, 11a–11c, and the broadcasting equipment 1, and an optical modulation-and-demodulation unit 3 connected to the two-way combining-and-distributing unit 2. The optical modulation-and-demodulation unit 3 is connected to an optical modulation-and-demodulation unit 5 on the subscriber side through an optical cable 4.

On the subscriber side, two-way amplifiers 7, 7a–7c, tap-off parts 8, 9, and terminal equipment 12, 12a in the subscriber houses are provided. The two-way amplifiers 7, 7a–7c are connected to the optical modulation-and-demodulation unit 5 using coaxial cables 6 in series or in a shunt manner. Further, each of the terminal equipment 12, 12a is connected to the optical modulation-and-demodulation unit 5 through the two-way amplifiers 7, 7a–7c and the tap-off parts 8, 9.

In such a configuration, down-link electrical signals produced from the broadcasting equipment 1 and the TDMA equipment 11, 11a–11c, which will be transmitted to the respective terminal equipment 12, 12a, are combined in the two-way combining-and-distributing unit 2. After that, the combined signal is converted to an optical signal in the optical modulation-and-demodulation unit 3, and is transmitted to the optical modulation-and-demodulation unit 5 through the optical cable 4.

The transmitted optical signal is converted into an electrical signal in the optical modulation-and-demodulation unit 5. After that, the electrical signal is amplified in the respective two-way amplifiers 7, 7a–7c through the coaxial cables 6. After the electrical signal is branched according to a connection configuration of the amplifiers, the branched electrical signals are transmitted to the respective terminal equipment 12, 12a through the TO parts 8, 9 having combining and distributing functions.

On the other hand, up-link electrical signals produced from the respective terminal equipment 12, 12a, which will be transmitted to the broadcasting equipment 1 and the TDMA equipment 11, 11a–11c, are transmitted to the optical modulation-and-demodulation unit 5 through the TO parts 8, 9 and the two-way amplifiers 7, 7a–7 while being combined.

In the optical modulation-and-demodulation unit 5, the combined up-link electrical signal is converted into an optical signal, and is transmitted to the optical modulation-and-demodulation unit 3 through the optical cable 4. In the optical modulation-and-demodulation unit 3, the optical signal is converted into an electrical signal.

The converted electrical signal is distributed in the two-way combining-and-distributing unit 2, and the distributed signals are transmitted to the respective TDMA equipment 11, 11a–11c and broadcasting equipment 1.

For providing a telephone service in such a network structure, signal processing between the TDMA equipment 11 and the terminal equipment 12 has an important role.

In the following, a description will be given of a prior-art signal processing between the TDMA equipment 11 and the terminal equipment 12, by referring to FIG. 2. FIG. 2 shows a detailed block diagram of internal configurations of the prior-art TDMA equipment 11 and the prior-art terminal equipment 12.

In FIG. 2, the TDMA equipment 11 is connected to the switching system 10 providing the two-way-CATV-system's telephone service, and the terminal equipment 12 provided in the subscriber's house is connected to a telephone 13. To simplify the description, the terminal equipment 12 and the TDMA equipment 11 are substantially directly connected to each other, and the optical transmission system such as optical modulation-and-demodulation units 3, 5 are not shown in FIG. 2.

In the following, a description will be given of a frame structure of the down-link signal transmitted from the TDMA equipment 11 to the terminal equipment 12 and a frame structure of the up-link signal transmitted in a reversal direction, by referring to FIG. 3 to FIG. 5C.

First, a description will be given of the frame structure of the down-link signal, by referring to FIG. 3. FIG. 3 shows the frame structure of the down-link signal represented in a matrix form. In the frame structure of the down-link signal shown in FIG. 3, in a row direction, one frame is constituted by 128 timeslots indicated by timeslot numbers (TSNo.) "0" to "127". The each frame has a 125-$\mu$sec time interval. One timeslot is constructed with 8 bits.

In a column direction, a plurality of frames indicated by frame numbers (frame No.) "00" to "31" are arranged in the order of the frame numbers to constitute one multiframe. Since the multiframe is constructed with 32 frames, the one multiframe has a 4-msec time interval.

When the down-link signal having such a multiframe structure is transmitted from the TDMA equipment 11 to the terminal equipment 12, the frames "00" to "31" are successively transmitted in that order, and, after that, the frames "00" to "31" of the next multiframe are successively transmitted.

A symbol "MF" in the frame "00" is called a multiframe bit, and is constructed with a bit pattern indicating a top position of the multiframe. A symbol "F" in the respective frames "01" to "31" is called a frame bit, and is constructed with a bit pattern indicating a top position of the respective frame.

In the timeslots "02" to "32" in the respective frames "00" to "07", M channels (1) to (8) are provided. The M channels (1) to (8) are commonly used for measuring a distance between the TDMA equipment 11 and the terminal equipment 12 by measuring a delay time of the up-link signal returned from the terminal equipment 12 on the subscriber side to the TDMA equipment 11.

The TDMA equipment 11 sends measured distance information to the terminal equipment 12, and controls a transmission timing from the terminal equipment 12 to the TDMA equipment 11. In this way, a transmit signal from the terminal equipment 12 is synchronized with a system clock signal in the TDMA equipment 11 for each bit.

In the timeslots "02" to "32" in the respective frames "08" to "31", D channels (1) to (24) are provided. The D channels (1) to (8) are used as control channels for controlling the terminal equipment 12 on the subscriber side. For example, the D channel is used for transmitting a variety of information such as calling, terminating, and informing of an available B channel (discussed later).

The B channels B0 to B94 provided in the timeslots "33" to "127" of the respective frames are channels for speech and data, and are used for transmitting, for example, speech of a person using the telephone 13 connected to the terminal equipment 12 in the subscriber's house, and data of a personal computer connected to the terminal equipment 12.

FIG. 4 shows illustrations for explaining a relationship between the frame structure of the up-link signal and the frame structure of the down-link signal. An illustration (a) shows the one multiframe in which the frames "00" to "31" are arranged in series. An illustration (b) shows a configuration of the frame "00", and an illustration (c) shows a configuration of the frame "31". Further, an illustration (d) shows a configuration of the B channel B0 in the frame. As shown in the illustration (d), each B channel is constructed with 8 bits of b0 to b7, and has a 975-nsec time interval.

On the other hand, an illustration (e) shows the frame structure of the up-link signal. The frame structure of the up-link signal is constructed with the M channel, a distance-measurement window, the D channel, and the B channels B0 to B94. The time interval of the whole up-link signal frame is 4 msec, which is the same as that of the down-link signal frame.

The M channel and the distance-measurement window of the up-link signal are, in the same way as the down-link signal, used for measuring the distance between the TDMA equipment 11 and the terminal equipment 12 by measuring a delay time of the up-link signal returned from the terminal equipment 12 in the subscriber to the TDMA equipment 11.

The TDMA equipment 11 informs measured distance information to the terminal equipment 12, and controls a transmission timing from the terminal equipment 12 to the TDMA equipment 11. In this way, a transmit signal from the terminal equipment 12 is synchronized with a clock signal in the TDMA equipment 11 for each bit.

FIG. 5A shows a frame structure of the M channel. The frame structure of the M channel is constructed with a 16-bit guard timing (G), a preamble, a unique word (UW), data, and a cyclic redundancy check (CRC). The preamble and the unique word are formed by 256 bits, and the data and the CRC are formed by 64 bits.

The guard timing (G) is provided as a buffer time so as to have no influence on the previous and next channels even if the terminal equipment 12 misses the transmission timing by several bits. In the terminal equipment 12, during the guard timing, transmission of a carrier is also stopped.

The preamble is provided such that the TDMA equipment 11 synchronizes with a signal transmitted from the terminal equipment 12. In general, in the preamble data, data "0011" is repeatedly provided. The unique word is provided for indicating an end position of the preamble or a start position of the data. After the TDMA equipment 11 detects the preamble, data reception in the TDMA equipment 11 starts.

The CRC is provided for detecting a data error. In the TDMA equipment 11, when the CRC is checked and a data error is detected, the erroneous data is processed as invalid data. In this case, the terminal equipment 12 is controlled to transmit the same data again.

The D channel shown in the illustration (e) of the FIG. 4 is, in the same way as the down-link signal, a control channel for controlling the terminal equipment 12 on the subscriber side. For example, the D channel is used for transmitting a variety of information such as calling, terminating, and informing of an available B channel.

FIG. 5B shows a frame structure of the D channel. The frame structure of the D channel is constructed with the guard timing (G), the unique word (UW), the data, and the CRC. The guard timing and the unique word are formed by 24 bits, and the data and the CRC are formed by 256 bits.

On the side of the terminal equipment 12, synchronization can be established by the M channel. Therefore, the D channel has no preamble as compared to the M channel.

An illustration (f) in FIG. 4 shows a frame structure of each B channel in the up-link signal represented by (e) of FIG. 4. The frame structure of each B channel has a 34-$\mu$sec time interval, and is constructed with the guard timing (G), the unique word (UW), and data of b0 to b255.

FIG. 5C shows a frame structure of the B channel. The B channel is constructed with the guard timing (G), the unique word (UW), and the data. The guard timing and the unique word are formed by 24 bits, and the data is formed by 256 bits. The B channel has no preamble for the same reason as that of the D channel. Further, the B channel has no CRC, because it is difficult to process the CRC in the B channel. In general, a re-transmission request due to a communication error in the B channel depends on the terminal equipment 12.

In the following, a description will be given of the two-way CATV system supplying the telephone service which is provided by the abovediscussed frame structures of the down-link signal and the up-link signal, by referring to FIG. 2.

Returning to FIG. 2, the TDMA equipment 11 includes interface parts (PRI parts) 20 to 23 for interfacing with the switching system 10, a network part (NW part) 24, a D1-channel interface part (D1 part) 25, a CPU 26, a frame assembling part (FRMA part) 27, a frame disassembling part (FRMD part) 28, M-channel interface parts (M parts) 29, 30, D2-channel interface parts (D2 parts) 31, 32, a modulation part (MOD part) 33, and a demodulation part (DEM part) 34.

A numeral "35" indicates a wave distributing part (WD part) included in the two-way combining-and-distributing unit 2 shown in FIG. 1. The WD part 35 is connected to the MOD part 33 and the DEM part 34. Further, a maintenance console part (MC part) 36 is connected to the CPU 26.

The terminal equipment 12 includes a WD part 38, a DEM part 39, a MOD part 40, a FRMD part 41, a FRMA part 42, M parts 43, 44, D2 parts 45, 46, B-channel control parts (BC parts) 47, 48, a CPU 49, and a subscriber-line interface part (SLI part) 50. Further, the telephone 13 is connected to the SLI part 50.

In the above-discussed structure, the PRI parts 20 to 23, connected between the switching system 10 and the NW part 24, are provided by trunk cards in an integrated services digital network (ISDN), and have an interface function between the switching system 10 and the NW part 24.

The NW part 24 is connected between the PRI parts 20 to 23 and the FRMA part 27, and is also connected between the PRI parts 20 to 23 and the FRMD part 28. Further, the NW part 24 is provided in a path between the PRI parts 20 to 23 and the CPU 26 through the D1 part 25. The NW part 24 has a speech data exchange processing function between the PRI parts 20 to 23 and any one of the FRMA part 27 and FRMD part 28. Further, the NW part 24 has a D1-channel interface function by the D1 part 25 provided between the PRI parts 20 to 23 and the CPU 26. The D1 channel is a call-processing control channel between the switching system 10 and the TDMA equipment 11.

The FRMA part 27 is connected to the NW part 24, the MOD part 33, and the CPU 26 through the M part 29 and the D2 part 31. The FRMA part 27 has a function of assembling speech data (64 kbps/channel×95 channels) transmitted from the 4 PRI parts 20 to 23 on the B channels B0 to B94 through the NW part 24 and control signals transmitted from the CPU 26 on the M channels and the D channels through the M part 29 and the D2 part 31, to a 8.192-Mbps (8 bits×128 timeslots×32 frames/4 msec) frame shown in FIG. 3.

The MOD part 33 is connected to the WD part 35, modulates a digital signal transmitted from the FRMA part 27 by means of a quadrature phase shift keying (QPSK), and converts the modulated digital signal into an RF (radio frequency) signal. The RF signal is transmitted to the terminal equipment 12 through the WD part 35.

FIG. 6 shows frequency allocation of the down-link RF signal toward the terminal equipment 12 and the up-link RF signal toward the TDMA equipment 11. In FIG. 6, as shown by a numeral "52", an overall frequency band of the up-link signal ranges from 10 to 50 MHz, and any 6-MHz band of the overall frequency band 52 is allocated to the up-link RF signal, as indicated by a numeral "53".

With regard to the down-link signal, as shown by a numeral "54", an overall frequency band of the down-link signal ranges from 70 to 550 MHz, and any 6-MHz band of the overall frequency band 54 is allocated to the down-link RF signal, as indicated by a numeral "55".

On the other hand, the up-link RF signal transmitted from the terminal equipment 12 is transmitted to the DEM part 34 through the WD part 35, and is converted down. The down-converted up-link signal is demodulated by means of the QPSK, and is provided to the FRMD part 28. In this case, the signal frame is constructed with the M channel, the D channel, and the B channel shown in FIG. 5.

The FRMD part 28 is connected to the NW part 24, and is connected to the CPU 26 through the M part 30 and the D2 part 32. The FRMD part 28 disassembles the signal frame produced from the DEM part 34 to the M channel, the D channel, and the 95 B channels.

The data on the B channels is transmitted to the PRI parts 20 to 23 through the NW part 24, and the data on the M channel and the D channel is transmitted to the CPU 26 through the M part 30 and the D2 part 32.

The CPU 26 processes a call control between the switching system 10 and the TDMA equipment 11 by using the D1 channel, a distance control between the TDMA equipment 11 and the terminal equipment 12 by using the M channel, a call control by using the D2 channel, and a maintenance control by means of an operation of the MC part 36. Namely, the MC part 36 is used for monitoring a condition of the terminal equipment 12.

The WD parts 35, 38 are connected to each other through a connecting transmission line between the TDMA equipment 11 and the terminal equipment 12. Each of the WD parts 35, 38 has a two-way band-pass filtering function of passing both the up-link RF signal and the down-link RF signal.

The WD part 35 has functions of combining the down-link RF signal path from the MOD part 33 and the up-link RF signal path to the DEM part 34, and combining a plurality of signals from the TDMA equipment 11, 11a–11c. The WD part 38 has a function of combining the up-link RF signal path from the MOD part 40 and the down-link RF signal path to the DEM part 39. The WD part 38 is provided within the terminal equipment 12.

The DEM part 39 in the terminal equipment 12 is connected between the WD part 38 and the FRMD part 41. The DEM part 39 converts the down-link RF signal produced from the WD part 38 to a lower frequency signal, and demodulates the signal by means of QPSK. A demodulated digital signal, which has the frame structure shown in FIG. 3, is transmitted to the FRMD part 41.

The FRMD part 41 is connected to the CPU 49 through the M part 43, the D2 part 45, and the BC part 47, and is also connected to the SLI part 50. The FRMD part 41 derives an M-channel signal and a D2-channel signal from the down-link signal produced from the DEM part 39, and transmits these derived signals to the CPU 49 through the M part 43 and the D2 part 45. Further, from a control of the BC part 47, the FRMD part 41 transmits the B-channel data designated by the CPU 49 to the SLI part 50.

The SLI part 50 has a CODEC (coder and decoder) function and a telephone-interface function. The SLI part 50 converts the B-channel data transmitted from the FRMD part 41 into an analog signal by the CODEC function, and transmits the analog signal to the telephone 13. Further, the SLI part 50 converts an analog signal transmitted from the telephone 13 into a digital signal by the CODEC function, and transmits the digital signal to the FRMA part 42.

The FRMA part 42 is connected to the CPU 49 through the M part 44, the D2 part 46, and the BC part 48, and, also, is connected to the MOD part 40. When an instruction for transmitting the B channel is provided from the CPU 49 through the BC part 48, the B-channel data transmitted from the SLI part 50 is provided to one timeslot of the B channels "B0" to "B94" in the up-link frame (e) shown in FIG. 4, and is transmitted to the MOD part 40.

Further, when an instruction for transmission of the M channel or the D channel is provided from the CPU 49, the M-channel data or the D-channel data is provided to the respective time slots, and are transmitted to the MOD part 40.

The MOD part 40 is connected to the WD part 38, and, only when the data is transmitted from the FRMA part 42, modulates the data by means of QPSK. Further, the MOD part 40 converts the modulated data into a higher frequency up-link RF signal, and transmits the up-link RF signal to the TDMA equipment 11 through the WD part 38.

The CPU 49 has a distance control function by means of the M channel, a call control function by means of the D2 channel, and a function of controlling the SLI part 50.

In the above-discussed two-way CATV supplying the telephone service, to confirm whether the information is correctly transmitted between the TDMA equipment 11 and the terminal equipment 12, a line-quality measuring unit may be provided.

In the line-quality measuring unit, by measuring data-transmission errors between the TDMA equipment 11 and the terminal equipment 12, the line quality may be detected. In general, when the measured line quality is less than a predetermined value, a cause why the line quality is degraded is analyzed, and a countermeasure is considered. In the following, typical causes of line-quality degradation will be described.

When connection in the connectors of the coaxial cables as transmission lines is poor, outside noise may enter into the transmission lines. When a malfunction occurs, such as, for example, a sealing material of the coaxial cable breaking, outside noise likewise enter into the transmission lines. Further, when amplifiers provided at intervals of 200 m in the transmission line malfunction, noise may also occur.

Next, a description will be given of a prior-art line-quality measuring method, by referring to FIG. 7 and FIG. 8. FIG. 7 shows a block diagram of the prior-art line-quality measuring system for the down-link signal. FIG. 8 shows a block diagram of the prior-art line-quality measuring system for the up-link signal. Elements in FIG. 2 which are the same as those of FIG. 7 and FIG. 8 are given the same reference numerals. Further, to simplify the description, descriptions for the same elements will be eliminated.

In FIG. 7, in the TDMA equipment 11, an interface part (INF part) 57 is provided instead of the FRMA part 27 shown in FIG. 2, and a conventional line-quality measuring unit (MEAS part) 58 is connected to the INF part 57.

Further, in the terminal equipment 12, an interface part (INF part) 59 is provided instead of the FRMD part 41 shown in FIG. 2. By connecting a line-quality measuring unit (MEAS part) 60 to the INF part 59, the down-link line-quality measuring system is constructed.

In the down-link line-quality measuring system, the PRI parts 20 to 23, the NW part 24, and the CPU 26 in the TDMA equipment 11 shown in FIG. 2 are not used. The INF part 57 is provided between the MEAS part 58 and the MOD part 33, and is operative only as interface means transiting a signal produced from the MEAS part 58 to the MOD part 33.

Further, the INF part 59 in the terminal equipment 12 is provided between the DEM part 39 and the MEAS part 60, and is operative only as interface means transiting a signal produced from the DEM part 39 to the MEAS part 58.

In such a configuration, a pseudo-random noise signal is successively produced from the MEAS part 58 in the TDMA equipment 11, and is transmitted to the terminal equipment 12 through the INF part 57, the MOD part 33, the WD part 35, and the transmission line. The pseudo-random noise signal is input to the DEM part 39 through the WD part 38, and is demodulated. The demodulated pseudo-random noise signal is transmitted to the MEAS part 60 through the INF part 59.

The MEAS part 60 can generate a reference signal which is the same as the pseudo-random noise signal generated in the MEAS part 58. Therefore, the MEAS part 60 compares the pseudo-random noise signal transmitted from the TDMA equipment 11 with the reference signal, and measures a bit error rate (BER) in the down-link communication line from the TDMA equipment 11 to the terminal equipment 12. When a value of the BER is larger than a predetermined value, it is determined that the down-link communication line is in a poor condition.

On the other hand, in FIG. 8, in the TDMA equipment 11, an interface part (INF part) 62 is provided instead of the FRMD part 28 shown in FIG. 2, and a conventional line-quality measuring unit (MEAS part) 63 is connected to the INF part 62.

Further, in the terminal equipment 12, an interface part (INF part) 64 is provided instead of the FRMA part 42 shown in FIG. 2. By connecting a line-quality measuring unit (MEAS part) 65 to the INF part 64, the up-link line-quality measuring system is constructed.

In such a configuration, a pseudo-random noise signal is successively produced from the MEAS part 65 in the terminal equipment 12, and is transmitted to the TDMA equipment 11 through the INF part 64, the MOD part 40, the WD parts 38, 35, and the transmission line. The pseudo-random noise signal is input to the DEM part 34, and is demodulated. The demodulated pseudo-random noise signal is transmitted to the MEAS part 63 through the INF part 62.

In the same way as the MEAS part 60, the MEAS part 63 can generate a reference signal which is the same as the pseudo-random noise signal generated in the MEAS part 65. Therefore, the MEAS part 63 compares the pseudo-random noise signal transmitted from the terminal equipment 12 with the reference signal, and measures a bit error rate (BER) in the up-link communication line from the terminal equipment 12 to the TDMA equipment 11. When a value of the BER is larger than a predetermined value, it is determined that the up-link communication line is in a poor condition.

The above-discussed communication-line-quality measuring system is applicable to the personal handyphone system (PHS) which is in commercial use in Japan. FIG. 9 shows a configuration example of the PHS. The PHS shown in FIG. 9 is constructed with a switching office 67 connected to a telephone network (not shown), a base station 68 connected to the switching office 67 through a transmission cable, and a subscriber's mobile terminal 69 carrying a radio communication with the base station 68 through a radio transmission line.

In such a system, the above-discussed TDMA equipment 11 is provided in the switching office 67, and the above-discussed terminal equipment 12 is provided in the mobile terminal 69. When line quality of the radio transmission line is measured, line-quality measurement is carried out by constructing the communication-line-quality measuring systems shown in FIG. 7 and FIG. 8.

However, there is the following problems in line-quality measurement by means of the communication-line-quality measuring systems shown in FIG. 7 and FIG. 8.

When the communication-line-quality measuring system is set up, an expert must go to the subscriber's house where the terminal equipment 12 is provided in order to provide a measurement apparatus (MEAS parts 60, 65) to the terminal equipment 12. Therefore, it takes much time and high cost.

Further, in the prior-art line-quality measuring system, it is substantially difficult to measure line quality of the terminal equipments 12 in all the subscribers.

During measurement, the telephone services for all the subscribers connected to the TDMA equipment 11 must be stopped.

In general, the data according to the frame structure shown in FIG. 3 and FIG. 5 is transmitted through the transmission line. However, when line quality is measured by means of the prior-art line-quality measuring system, the pseudo-random noise signal is successively transmitted regardless of the frame structure. Therefore, the signal structure in line-quality measurement is different from the practically-used signal structure in a general communication, and, thus, a precise line-quality measurement may not be carried out.

SUMMARY OF THE INVENTION

It is an object of the present invention to provide a communication-line-quality measuring system. In the system, precise line quality of a communication line may be efficiently measured without influencing an operation of a communication system. This permits the disadvantages described above to be eliminated.

The object described above is achieved by a communication-line-quality measuring system comprising: transmission equipment having: a first frame assembling part for transmitting a down-link multiplexed frame signal to a down-link line having a first frequency; and a first frame disassembling part for disassembling an up-link multiplexed frame signal transmitted through an up-link line having a second frequency; terminal equipment having: a second frame disassembling part for disassembling the down-link multiplexed frame signal; and a second frame assembling part for transmitting the up-link multiplexed frame signal which is obtained by frame-multiplexing an output signal of the subscriber unit with a control signal, to the up-link line; a pattern generation part, provided in the first frame assembling part, for providing a test signal to an available channel of signal frames in the down-link multiplexed frame signal; a loop-back part, provided between the second frame disassembling part and the frame assembling part, for looping back the test signal derived from the down-link multiplexed frame signal in the second frame disassembling part to the second frame assembling part so that the second frame assembling part provides the test signal in the up-link multiplexed frame signal to transmit to the transmission equipment; and a comparing part, provided in the transmission equipment, for comparing the test signal provided in the up-link multiplexed frame signal which is looped back by a control of the loop-back part with a reference signal which is the same as the test signal generated in the pattern generation part.

According to the above-discussed communication-line-quality measuring system according to the present invention, the test signal is provided to the available channel of the signal frames (for example, speech signal frames) in a conventional frame structure for transmitting the speech or data signals. The test signal provided in the conventional frame structure is transmitted from the transmission equipment to the terminal equipment through the down-link line, and looped back from the terminal equipment to the transmission equipment.

In the transmission equipment, the test signal in the conventional frame structure looped back from the terminal equipment is compared with the reference signal generated in the transmission equipment. As a result of the comparison, line quality of the down-link line and the up-link line may be determined.

In this way, since the test signal is transmitted in the practically used channel in the signal structure, the line quality of the communication line being in practical use may be precisely measured without influencing another operational channel.

The object described above is also achieved by a communication-line-quality measuring system comprising: transmission equipment having: a first frame assembling part for transmitting a down-link multiplexed frame signal to a down-link line having a first frequency; and a first frame disassembling part for disassembling an up-link multiplexed frame signal transmitted through an up-link line having a second frequency; terminal equipment having: a second frame disassembling part for disassembling the down-link multiplexed frame signal to produce a subscriber unit; and a second frame assembling part for transmitting the up-link multiplexed frame signal which is obtained by frame-multiplexing an output signal of the subscriber unit with a control signal, to the up-link line; a pattern generation part, provided in the first frame assembling part, for providing a test signal to an available channel of signal frames in the down-link multiplexed frame signal; and a comparing part, provided in the terminal equipment, for comparing the test signal derived from the down-link multiplexed frame signal in the second frame disassembling part with a reference signal which is the same as the test signal generated in the pattern generation part.

The object described above is also achieved by a communication-line-quality measuring system comprising: transmission equipment having: a first frame assembling part for transmitting a down-link multiplexed frame signal to a down-link line having a first frequency; and a first frame disassembling part for disassembling an up-link multiplexed frame signal transmitted through an up-link line having a second frequency; terminal equipment having: a second frame disassembling part for disassembling the down-link multiplexed frame signal; and a second frame assembling part for transmitting the up-link multiplexed frame signal which is obtained by frame-multiplexing an output signal of the subscriber unit with a control signal, to the up-link line; a pattern generation part, provided in the terminal equipment so as to connect with the second frame assembling part, for providing a test signal to an available channel of signal frames in the up-link multiplexed frame signal; a comparing part, provided in the transmission equipment, for comparing the test signal derived from the up-link multiplexed frame signal in the first frame disassembling part with a reference signal which is the same as the test signal generated in the pattern generation part.

And according to the above-discussed communication-line-quality measuring systems, the down-link line quality or the up-link line quality is respectively measured using the test signal provided in the available channel of the signal frames (for example, speech signal frames) in a conventional frame structure.

In the same way as the previously discussed system, since the test signal is transmitted in the practically-used channel in the signal structure, the line quality of the communication line being in practical use may be precisely measured without influencing another operational channel.

Other objects and further features of the present invention will be apparent from the following detailed description when read in conjunction with the accompanying drawings.

BRIEF DESCRIPTION OF THE DRAWINGS

FIG. 3 shows a frame structure of a down-link signal represented in a matrix form;

FIG. 5A shows a frame structure of an M channel;

FIG. 5B shows a frame structure of a D channel;

FIG. 5C shows a frame structure of a B channel;

FIG. 15 shows an illustration for explaining storage areas of a T part in the FRMD part shown in FIG. 14;

FIG. 17 shows a frame structure of a down-link signal including dedicated channels for line-quality measurement;

FIG. 19A shows one frame structure including the dedicated channel, FIG. 19B shows a structure of the typical B channel, and FIG. 19C shows a structure of the dedicated channel.

DETAILED DESCRIPTION OF THE PREFERRED EMBODIMENTS

Figure 10:
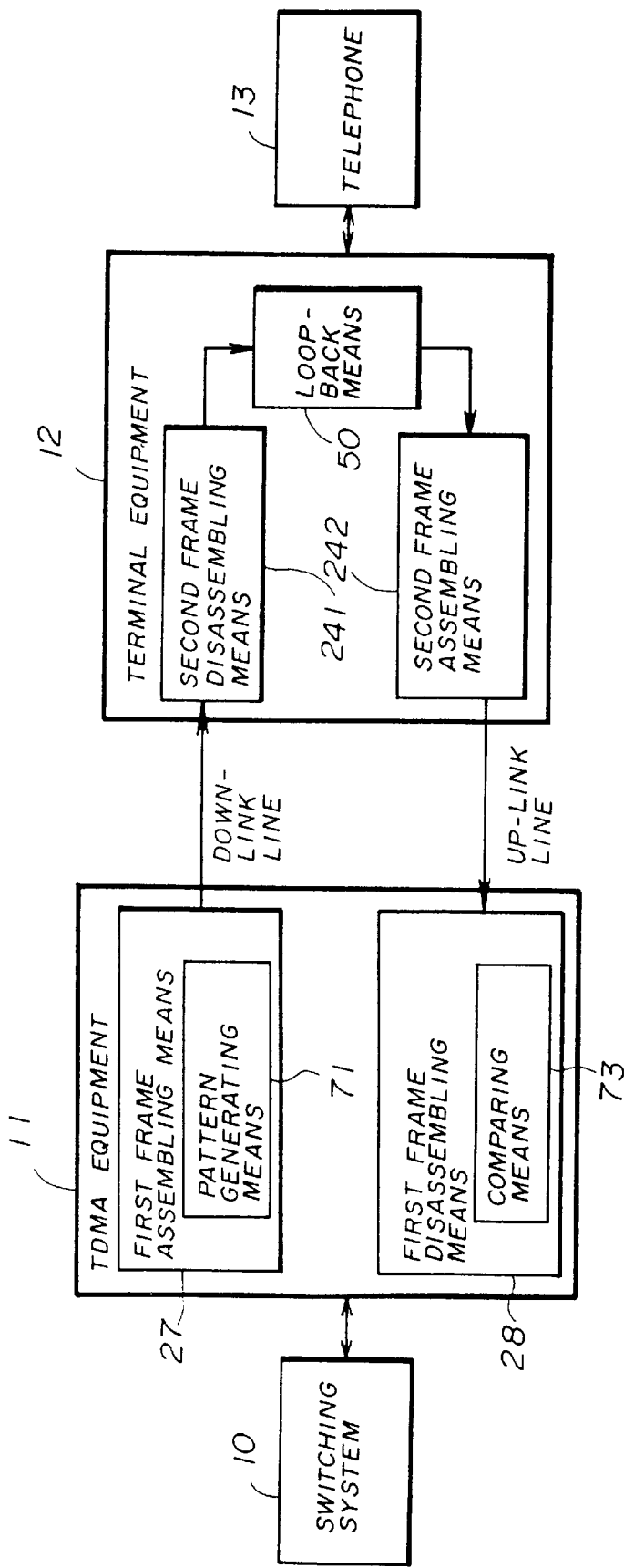
FIG. 10 shows a simplified configuration of a communication-line-quality measuring system according to the present invention.

First, a description will be given of an operation principle of a communication-line-quality measuring system according to the present invention, by referring to FIG. 10. FIG. 10 shows a simplified configuration of the communication-line-quality measuring system according to the present invention.

The communication-line-quality measuring system shown in FIG. 10 is constructed with first frame assembling means 27 and first frame disassembling means 28 which are provided in TDMA equipment 11; and second frame disassembling means 241, loop-back means 50, and second frame assembling means 242 which are provided in terminal equipment 12. A switching system 10 and a telephone 13 in FIG. 10 are the same as those of FIG. 2. The switching system 10 is connected to the TDMA equipment 11, and the telephone 13 is connected to the terminal equipment 12.

In the TDMA equipment 11, the first frame assembling means 27 transmits a down-link multiplexed-frame signal to a down-link line. The first frame disassembling means 28 disassembles an up-link multiplexed-frame signal to a plurality of signals, and transmits the signals to the switching system 10.

In the terminal equipment 12, the second frame disassembling means 241 disassembles the down-link multiplexed-frame signal to a plurality of signals, and transmits the signals to the telephones 13. The second frame assembling means 242 transmits the up-link multiplexed-frame signal to an up-link line.

The first frame assembling means 27 in the TDMA equipment 11 includes pattern generating means 71 providing a pseudo-random noise signal to an available channel of speech signal frames in the down-link multiplexed-frame signal.

The loop-back means 50 is connected between the second frame disassembling means 241 and the second frame assembling means 242, and controls to loop back the pseudo-random noise signal disassembled in the second frame disassembling means 241 to the TDMA equipment 11 through the second frame assembling means 242.

The first frame disassembling means 28 in the TDMA equipment 11 includes comparing means 73 comparing the pseudo-random noise signal looped back from the terminal equipment 12 with the pseudo-random noise signal generated in the pattern generating means 71.

In the above-discussed configuration, the pseudo-random noise signal is provided to the available channel of the speech signal frames in a conventional frame structure for transmitting the speech signals. The pseudo-random noise signal provided in the conventional frame structure is transmitted from the TDMA equipment 11 to the terminal equipment 12 through the down-link line, and looped back from the terminal equipment 12 to the TDMA equipment 11.

In the TDMA equipment 11, the pseudo-random noise signal in the conventional frame structure looped back from the terminal equipment 12 is compared with the reference pseudo-random noise signal generated in the TDMA equipment 11. As a result of the comparison, line quality of the down-link line and the up-link line may be determined.

Figure 11:
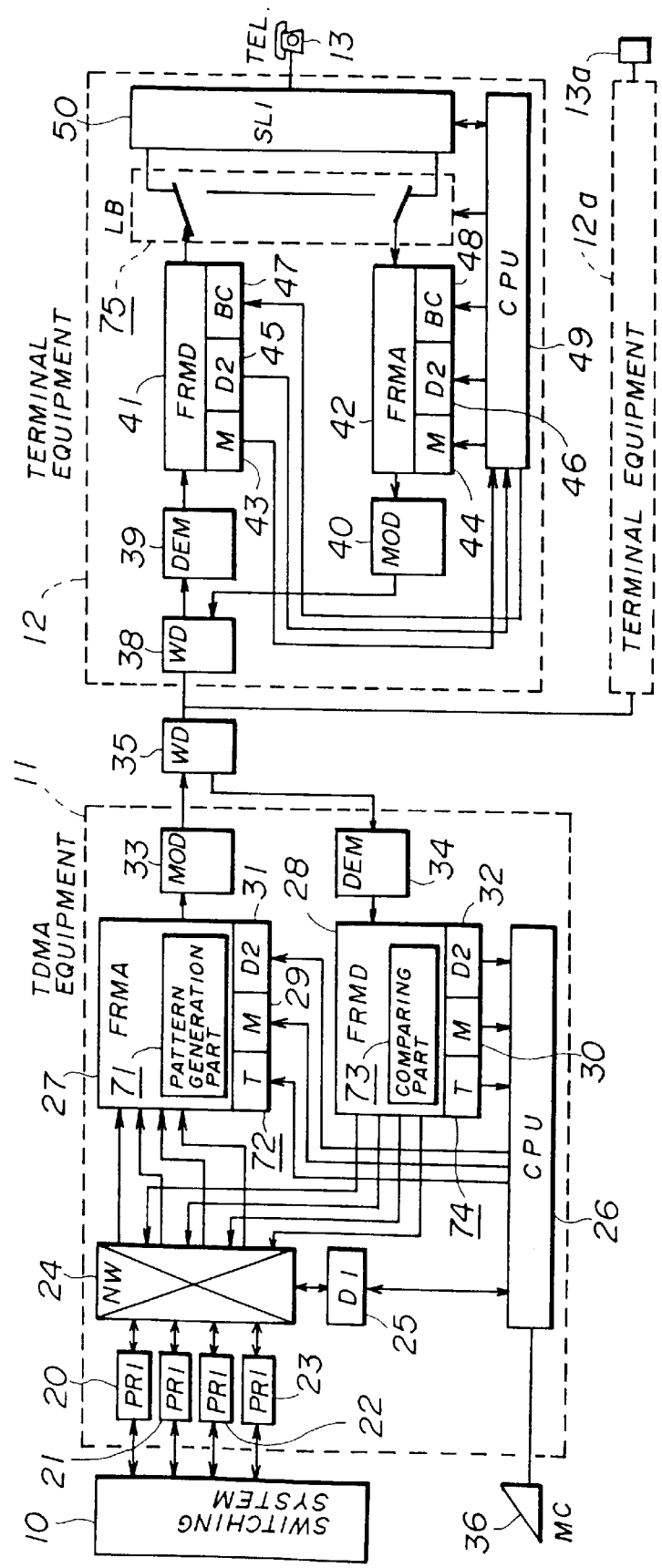
FIG. 11 shows a block diagram of a two-way CATV system supplying a telephone service to which a first embodiment of a communication-line-quality measuring system according to the present invention is applied.

Next, a description will be given of a first embodiment of the communication-line-quality measuring system according to the present invention, by referring to FIG. 11. FIG. 11 shows a block diagram of a two-way CATV system supplying a telephone service ton which the first embodiment of the communication-line-quality measuring system according to the present invention is applied. Elements in FIG. 11 which are the same as those of FIG. 2 are given the same reference numerals.

Figure 1:
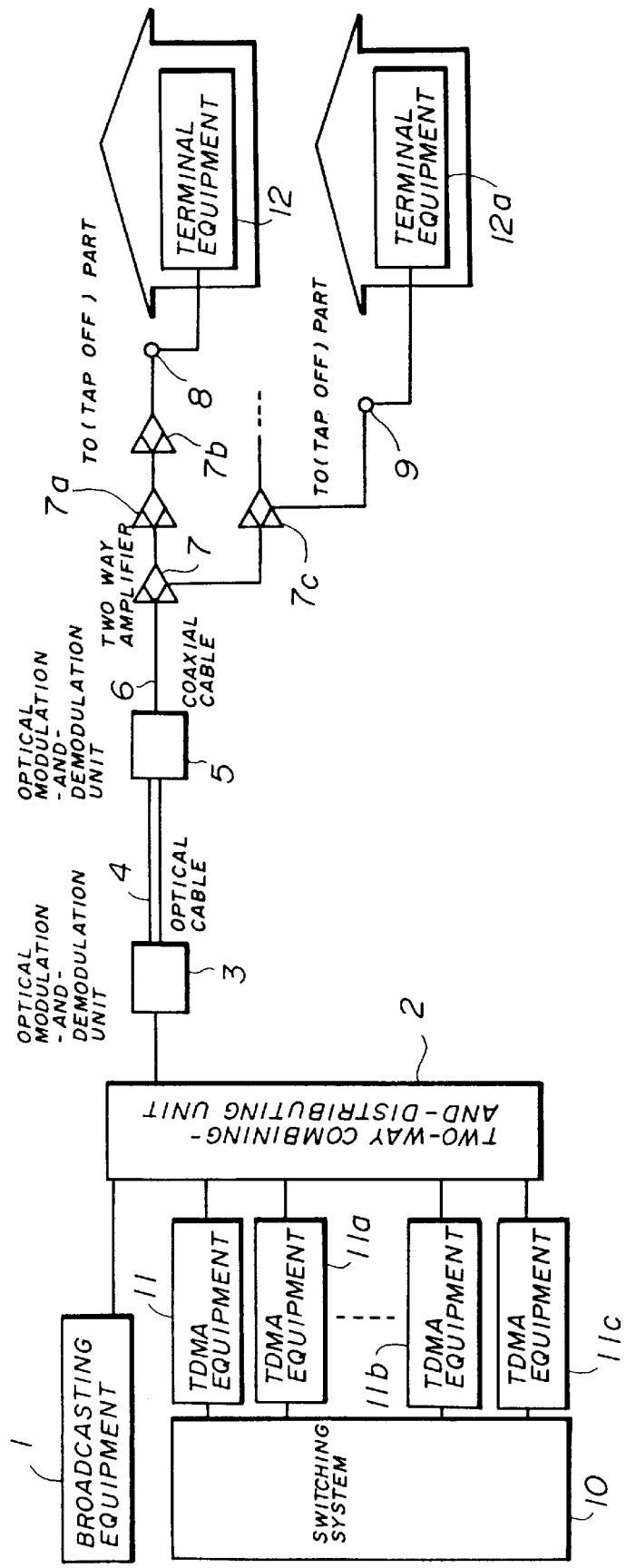
FIG. 1 shows a typical network configuration of a two-way CATV telephone service.
Figure 2:
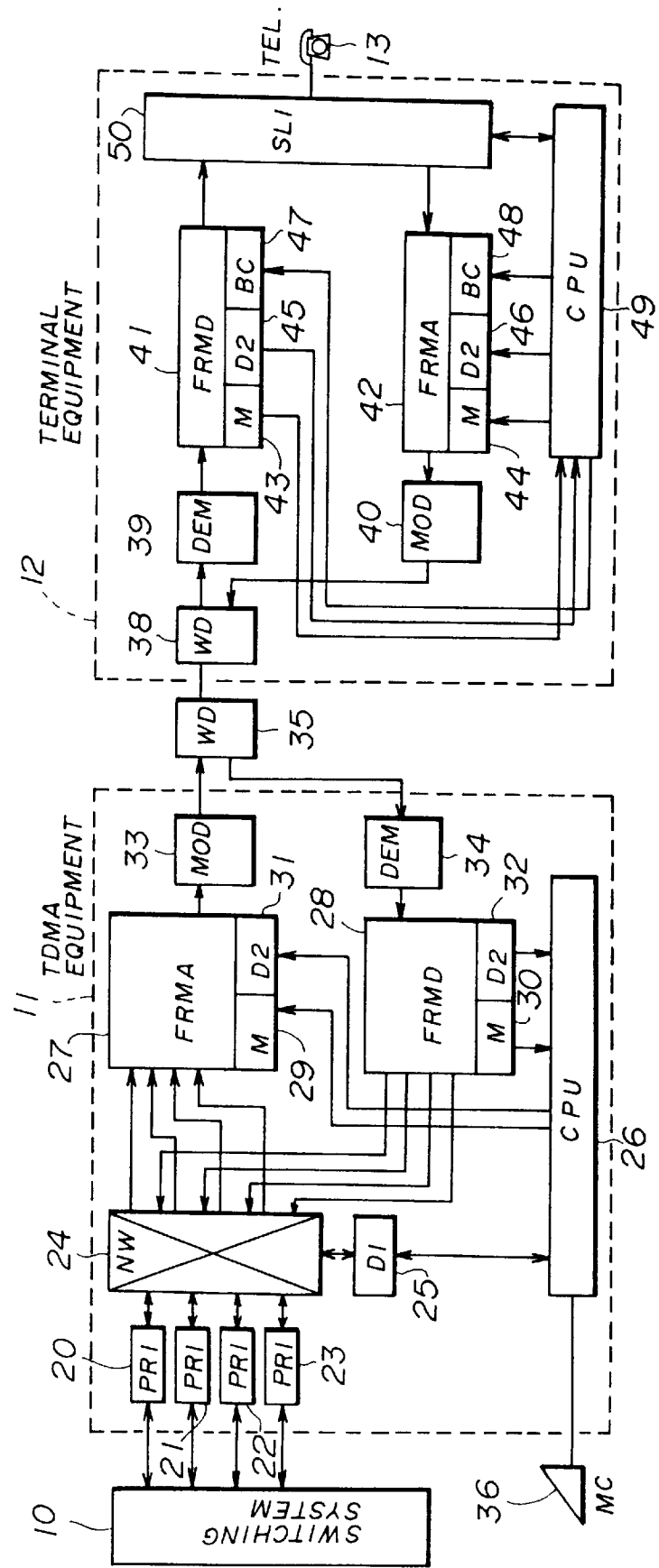
FIG. 2 shows detailed block diagrams of internal configurations of prior-art TDMA equipment and prior-art terminal equipment.

In the first embodiment of the communication-line-quality measuring system, as compared to the system shown in FIG. 2, a pattern generation part 71 is provided in the FRMA part 27 of the TDMA equipment 11, and, also, a register part (T part) 72 connecting the CPU 26 and the pattern generation part 71 is provided therein. Further, a comparing part 73 is provided in the FRMD part 28, and, also, a register part (T part) 74 connecting the CPU 26 and the comparing part 73 is provided therein.

In addition, in the terminal equipment 12, there is provided a loop-back part (LB part) 75 connecting the FRMD 41, the SLI part 50, and the FRMA part 42, or directly connecting the FRMD 41 and the FRMA part 42 without passing through the SLI part 50, according to a control of the CPU 49.

In FIG. 11, another terminal equipment 12a is also shown. Since the terminal equipment 12a has the same configuration as that of the terminal equipment 12, a description of the terminal equipment 12a is omitted.

The pattern generation part 71 provides a random pattern signal (for example, pseudo-random noise signal) to a specified B channel by an instruction of the CPU 26, and transmits the B channel including the random pattern signal to the terminal equipment 12. Further, the CPU 26 instructs the CPU 49 through the M channel to loop back the random pattern signal on the B channel.

In a normal state, the LB part 75 connects the FRMD 41, the SLI part 50, and the FRMA part 42. When the CPU 49 receives the instruction to loop back the random pattern signal on the B channel, the CPU 49 controls the LB part 75 to directly connect the FRMD 41 and the FRMA part 42 without passing through the SLI part 50. In this case, the random pattern signal on the B channel transmitted from the TDMA equipment 11 is looped back, and is directly returned to the TDMA equipment 11.

The comparing part 73 generates by itself a reference signal which is the same as the random pattern signal generated in the pattern generation part 71. The comparing part 73 compares the random pattern signal provided on the B channel which is returned back from the terminal equipment 12 with the reference signal, and measures line quality of both the up-link line and down-link line. As a result of the comparison, when a value of the BER is larger than the predetermined value, it is determined that the transmission line is in a poor condition.

Figure 12:
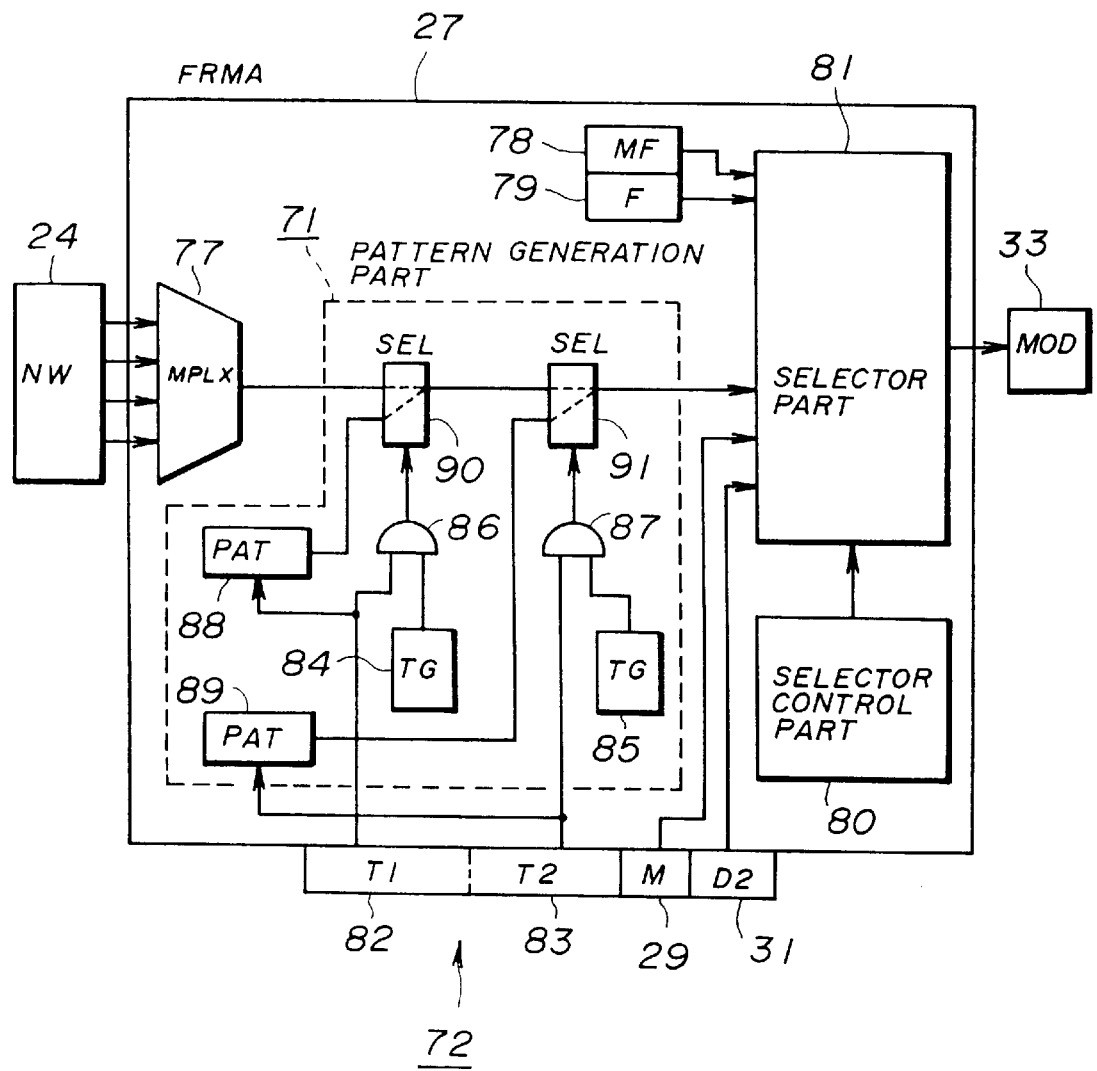
FIG. 12 shows a detailed block diagram of an FRMA part including a pattern generation part shown in FIG. 11.

FIG. 12 shows a detailed block diagram of the FRMA part 27 including the pattern generation part 71 shown in FIG. 11. The pattern generation part 71 has a configuration of simultaneously measuring line quality of two lines for the terminal equipment 12, 12a.

The FRMA part 27 shown in FIG. 12 includes, in addition to the pattern generation part 71, a multiplex part (MPLX part) 77, a multiframe bit generation part (MF part) 78, a frame bit generation part (F part) 79, a selector control part 80, and a selector part 81.

The MPLX part 77 is connected to the NW part 24, and multiplexes the respective B-channel signals produced from the NW part 24. The MF part 78 generates the MF shown in FIG. 3, and the F part 79 generates the F shown in FIG. 3.

The selector part 81 is connected to the MPLX part 77, the MF part 78, the F part 79, the M part 29, the D2 part 31, and the selector control part 80. The selector part 81 selects one of signals produced from the respective parts 77, 78, 79, 29 and 31 according to a control of the selector control part 80, and transmits the selected signal to the MOD part 33.

Figure 13:
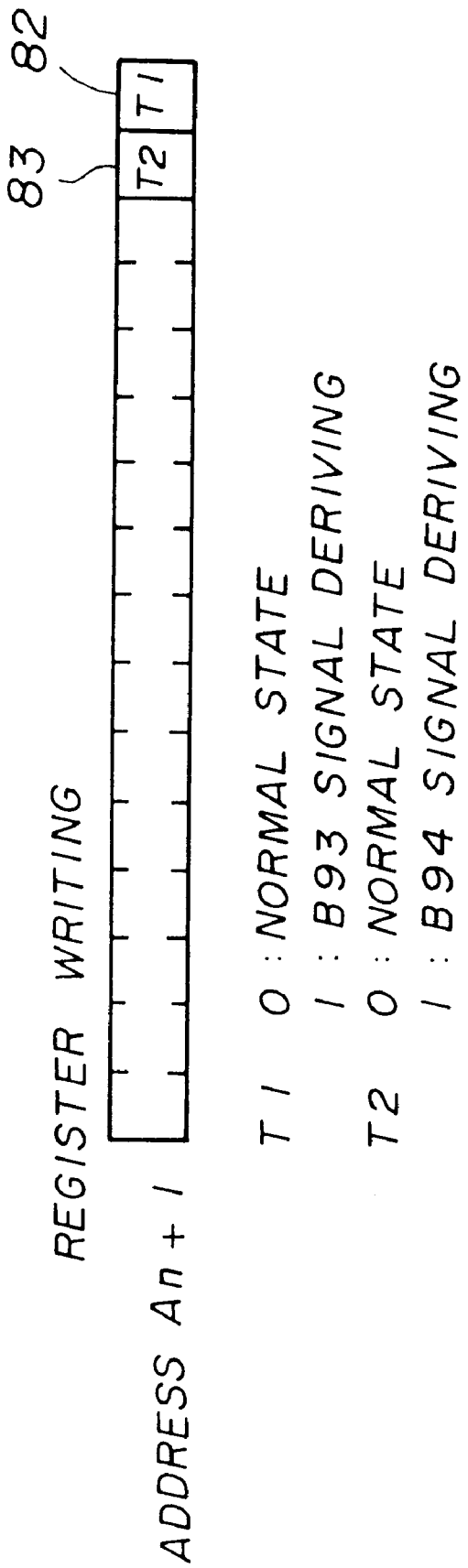
FIG. 13 shows an illustration for explaining a storage area of a T part in the FRMA part shown in FIG. 12.

FIG. 12 shows an illustration for explaining one storage area of the T part in the FRMA part 27 shown in FIG. 11. The T part 72 is connected to the CPU 26, and has a plurality of storage areas, each storage area having 16 bits as shown in FIG. 13. FIG. 13 shows the storage area addressed by an address An+l in the CPU 26. In the storage area shown in FIG. 13, the least significant bit (first bit) is represented by a T1 part 82, and the next bit (second bit) is represented by a T2 part 83. In the T1 part 82 and the T2 part 83, a logic "1" or "0" is written.

The pattern generation part 71 includes timing generation parts (TG parts) 84, 85, AND circuits 86, 87, random signal generation parts (PAT parts) 88, 89, and selector parts (SEL parts) 90, 91.

The TG part 84 is connected to one of input terminals of the AND circuit 86, and generates a logic "1" at a timing of the B channel B93 in the respective frames "00" to "31" shown in FIG. 3 to provide the logic "1" to the AND circuit 86.

The TG part 85 is connected to one of input terminals of the AND circuit 87, and generates a logic "1" at a timing of the B channel B94 in the respective frames "00" to "31" shown in FIG. 3 to provide the logic "1" to the AND circuit 87.

In the T1 part 82, an input side of the T1 part 82 is connected to the CPU 26, and an output side thereof is connected to the other one of the input terminals of the AND circuit 86 and an input terminal of the PAT part 88. When a logic "1" is written into the T1 part 82 by a control of the CPU 26, the T1 part 82 provides the logic "1" to the AND circuit 86 and the PAT part 88.

In the T2 part 83, an input side part of T2 part 83 is connected to the CPU 26, and an output side thereof is connected to the other one of the input terminals of the AND circuit 87 and an input terminal of the PAT part 89. When a logic "1" is written into the T2 part 83 by a control of the CPU 26, the T2 part 83 provides the logic "1" to the AND circuit 87 and the PAT part 89.

In the PAT part 88, an output side of the PAT part 88 is connected to one of input terminals of the SEL part 90. When the logic "1" produced from the T1 part 82 is input to the PAT part 88, the PAT part 88 generates a random pattern signal to the SEL part 90.

In the PAT part 89, an output side of the PAT part 89 is connected to one of input terminals of the SEL part 91. When the logic "1" produced from the T2 part 83 is input to the PAT part 89, the PAT part 89 generates a random pattern signal to the SEL part 91.

In the AND circuit 86, an output side of the AND circuit 86 is connected to a selection control terminal of the SEL part 90. The AND circuit 86 processes an AND operation (logical multiplication) of the output data (logic "1" or "0") of the TG part 84 and the T1 part 82, and provides a processing result to the SEL part 90.

In the AND circuit 87, an output side of the AND circuit 87 is connected to a selection control terminal of the SEL part 91. The AND circuit 87 processes an AND operation (logical multiplication) of the output data (logic "1" or "0") of the TG part 85 and the T2 part 83, and provides a processing result to the SEL part 91.

In the SEL part 90, the other input terminal of the SEL part 90 is connected to an output terminal of the MPLX part 77, and an output terminal of the SEL part 90 is connected to the other input terminal of the SEL part 91. When a logic "0" produced from the AND circuit 86 is provided to the SEL part 90, the SEL part 90 selects a signal produced from the MPLX part 77, and provides the selected signal to the SEL part 91. When a logic "1" produced from the AND circuit 86 is provided to the SEL part 90, the SEL part 90 selects the random pattern signal produced from the PAT part 88, and provides the selected random pattern signal to the SEL part 91.

Namely, a timing when a logic "1" is provided to the SEL part 90 is determined by both a timing when logic "1" is written into the T1 part 82 by the CPU 26 and a timing when a logic "1" is generated from the TG part 84 at the timing of the B channel B93. In this way, the random pattern signal is provided to the B channel B93 of the down-link signal frame shown in FIG. 3.

In the SEL part 91, an output terminal of the SEL part 91 is connected to one of input terminals of the selector part 81. When a logic "0" produced from the AND circuit 87 is provided to the SEL part 91, the SEL part 91 selects a signal produced from the SEL part 90, and provides the selected signal to the selector part 81. When a logic "1" produced from the AND circuit 87 is provided to the SEL part 91, the SEL part 91 selects the random pattern signal produced from the PAT part 89, and provides the selected random pattern signal to the selector part 81.

Namely, a timing when a logic "1" is provided to the SEL part 91 is determined by both a timing when a logic "1" is written into the T2 part 83 by the CPU 26 and a timing when a logic "1" is generated from the TG part 85 at the timing of the B channel B94. In this way, the random pattern signal is provided to the B channel B94 of the down-link signal frame shown in FIG. 3.

Figure 14:
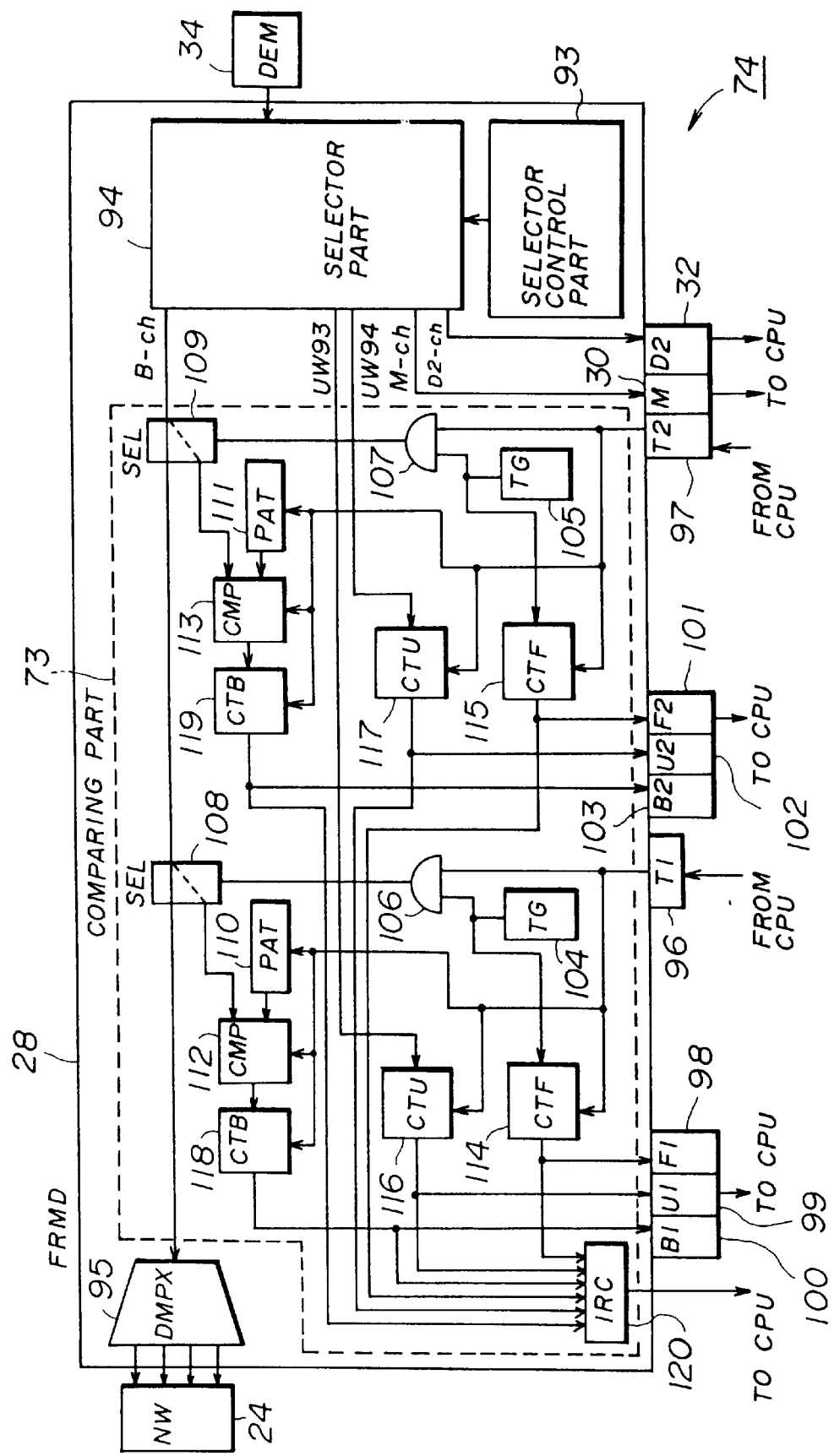
FIG. 14 shows a detailed block diagram of an FRMD part including a comparing part shown in FIG. 11.

Next, a description will be given of the FRMD part 28 in the TDMA equipment 11 shown in FIG. 11, by referring to FIG. 14. FIG. 14 shows a detailed block diagram of the FRMD part 28 including the comparing part 73 shown in FIG. 11. The comparing part 73 has a configuration of simultaneously measuring line quality of two lines for the terminal equipment 12, 12a.

The FRMD part 28 shown in FIG. 14 includes, in addition to the comparing part 73, a selector control part 93, a selector part 94, and a demultiplex part (DMPX part) 95.

The selector part 94 is connected to the selector control part 93 and the DEM part 34. The selector part 94 distributes the up-link signal in the frame structure (e) shown in FIG. 4 which is produced from the DEM part 34 according to a control of the selector control part 93, into the B channel (B-ch), the M channel (M-ch), the D channel (D2-ch), and UW93 and UW94 which are results of detecting the UW in the B channels B93 and B94.

The DMPX part 95 is connected between the NW part 24 and the selector part 94 through the comparing part 73, and transmits the B channel up-link signal produced from the selector part 94 to the NW part 24.

The T part 74 shown in FIG. 14 is connected to the CPU 26, and has a T1 part 96 and a T2 part 97 which are the same as the T1 part 82 and the T2 part 83 described by referring to FIG. 13. The T part 74 further has, as shown in FIG. 14, an F1 part 98, a U1 part 99, a B1 part 100, an F2 part 101, a U2 part 102, and a B2 part 103.

FIG. 15 shows an illustration for explaining storage areas of the T part 74 in the FRMD part 28 shown in FIG. 14. Particularly, FIG. 15 shows the F1 part 98, the U1 part 99, the B1 part 100, the F2 part 101, the U2 part 102, and the B2 part 103 of the storage areas of the T part 74.

The F1 part 98 is a 16-bit (b0 to b15) storage area addressed by an address An, and stores the number F1 of received frames of the B channel B93. The U1 part 99 is a 16-bit (b0 to b15) storage area addressed by an address An+2, and stores the number U1 of UW-undetections of the B channel B93. The B1 part 100 is a 16-bit (b0 to b15) storage area addressed by an address An+4, and stores the number B1 of bit errors of the B channel B93.

Further, the F2 part 101 is a 16-bit (b0 to b15) storage area addressed by an address An+6, and stores the number F2 of received frames of the B channel B94. The U2 part 102 is a 16-bit (b0 to b15) storage area addressed by an address An+8, and stores the number U2 of UW-undetections of the B channel B94. The B2 part 103 is a 16-bit (b0 to b15) storage area addressed by an address An+A, and stores the number B2 of bit errors of the B channel B94.

In FIG. 14, the comparing part 73 includes TG parts 104, 105, AND circuits 106, 107, SEL parts 108, 109, PAT parts 110, 111, comparing parts (CMP parts) 112, 113, frame-detection counting parts (CTF parts) 114, 115, unique-word-undetection counting parts (CTU parts) 116, 117, bit-error counting parts (CTB parts) 118, 119, and an interruption generating part (IRC part) 120.

Figure 4:
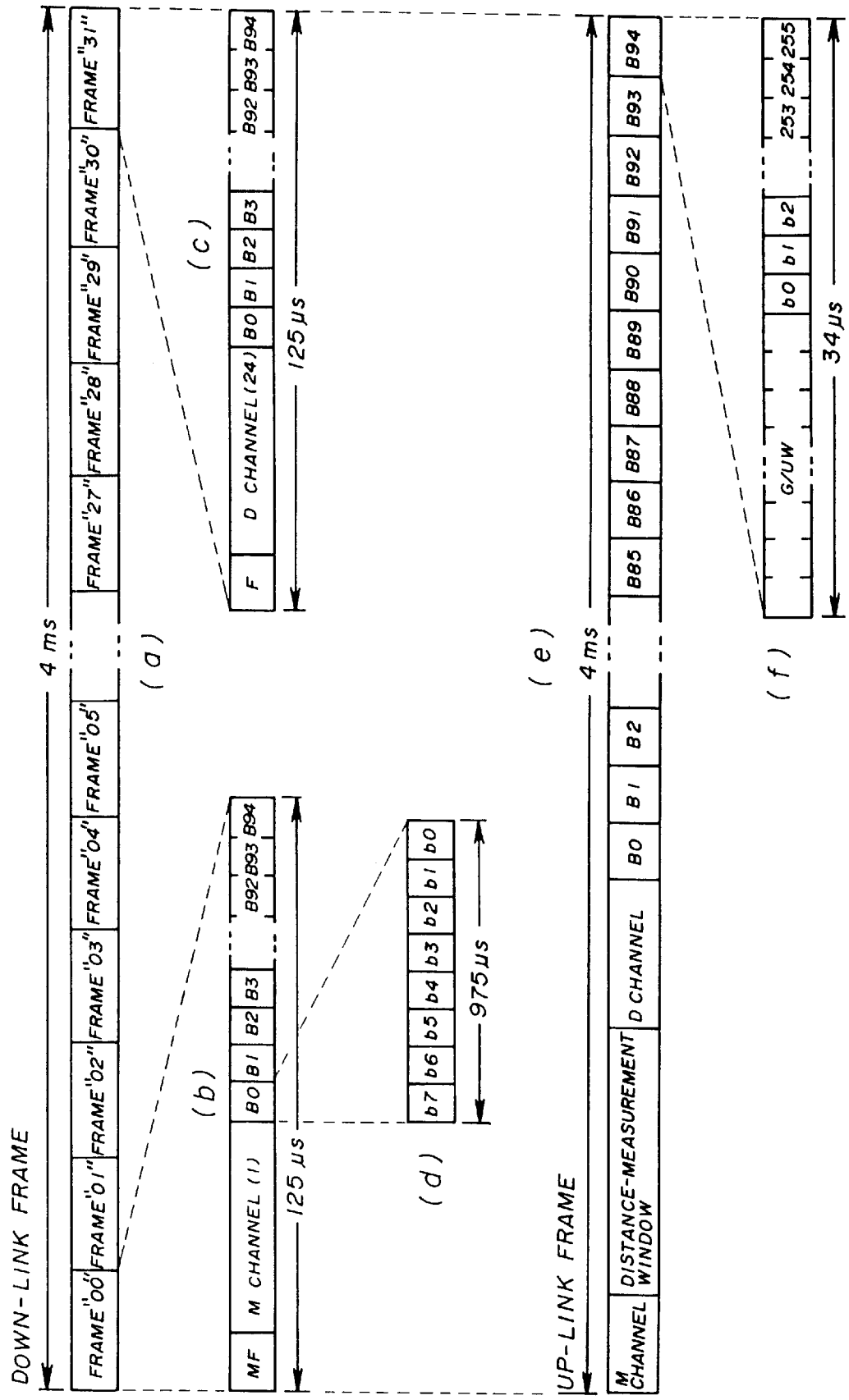
FIG. 4 shows an illustration for explaining a relationship between a frame structure of an up-link signal and a frame structure of a down-link signal.
Figure 6:
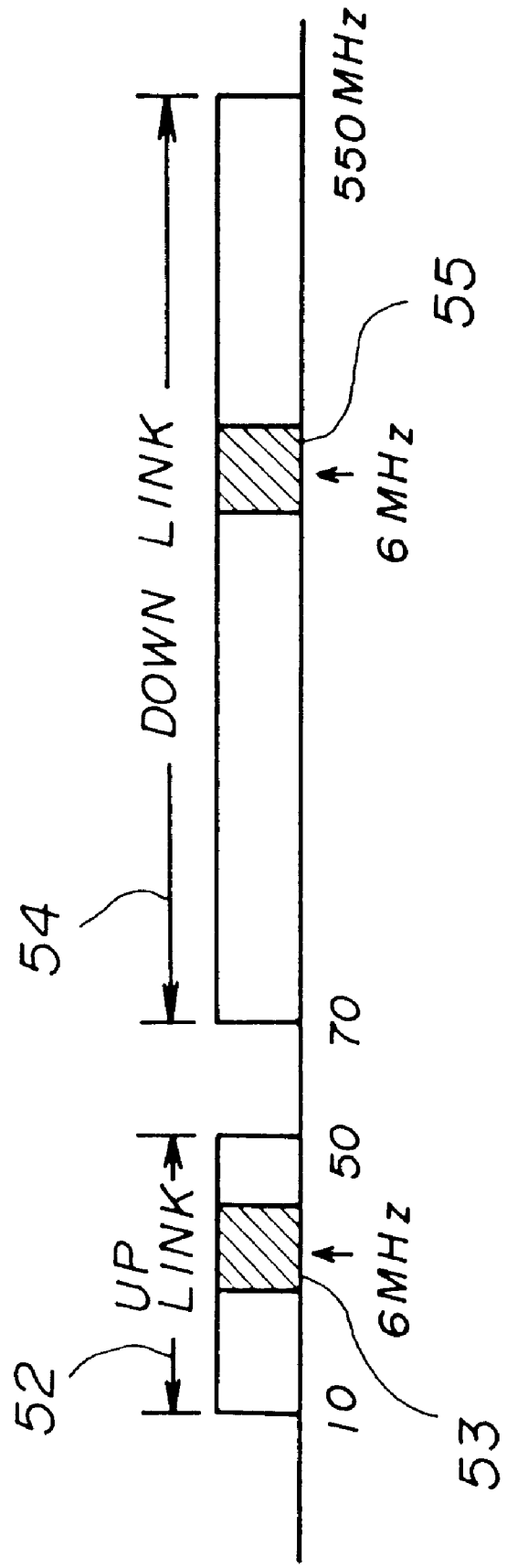
FIG. 6 shows frequency allocation of the down-link RF signal toward the terminal equipment and the up-link RF signal toward the TDMA equipment.
Figure 7:
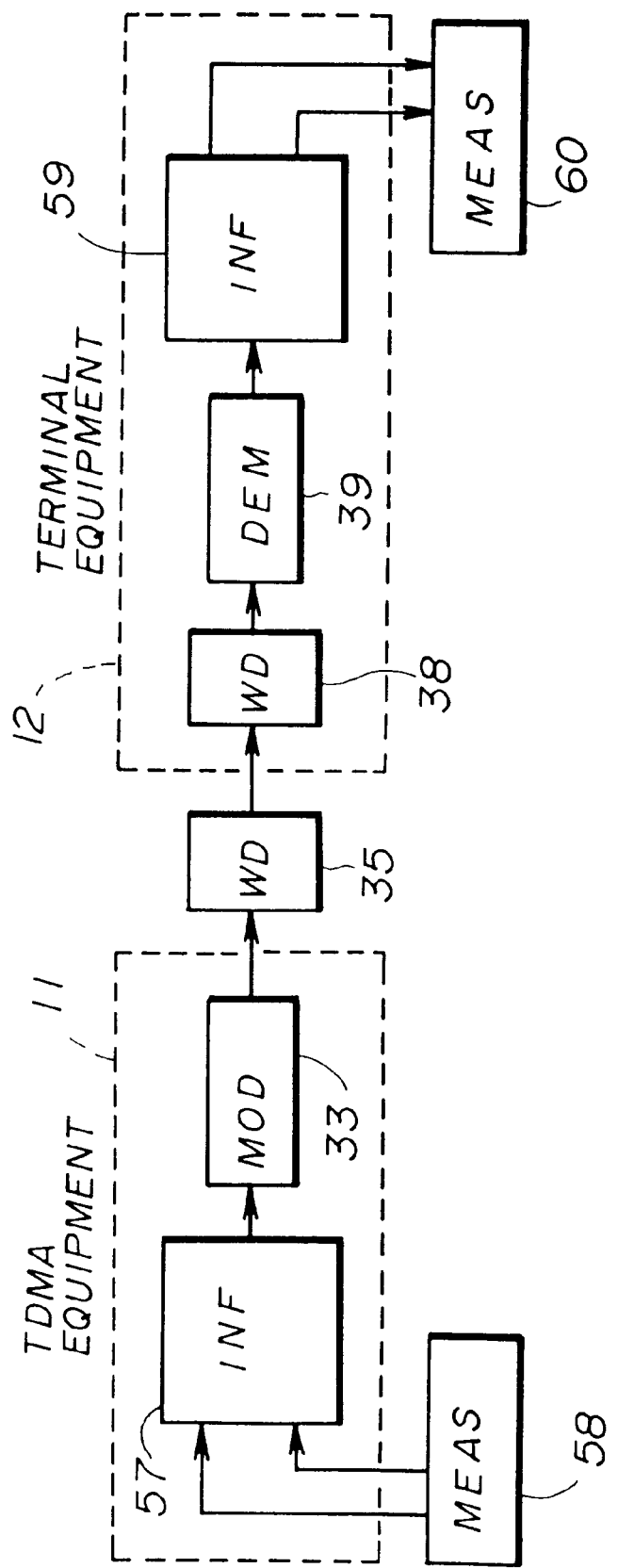
FIG. 7 shows a block diagram of a prior-art line-quality measuring system for the down-link signal.
Figure 8:
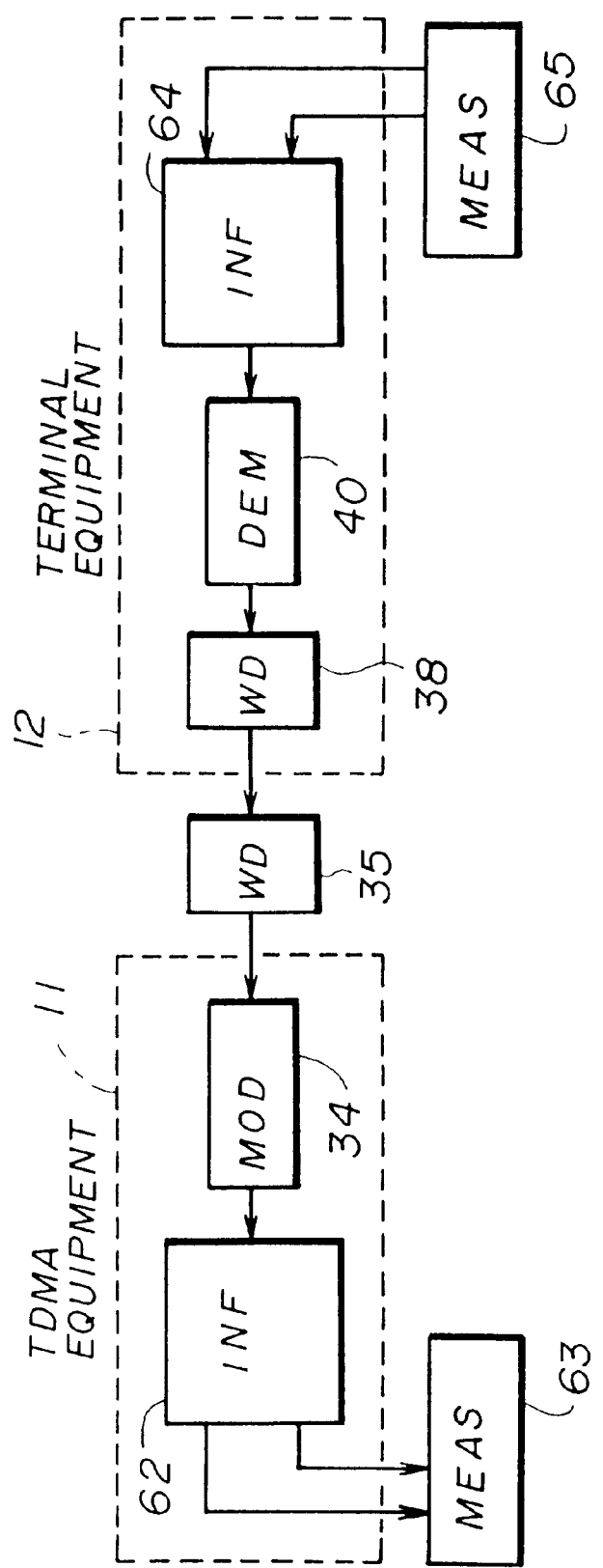
FIG. 8 shows a block diagram of a prior-art line-quality measuring system for the up-link signal.
Figure 9:
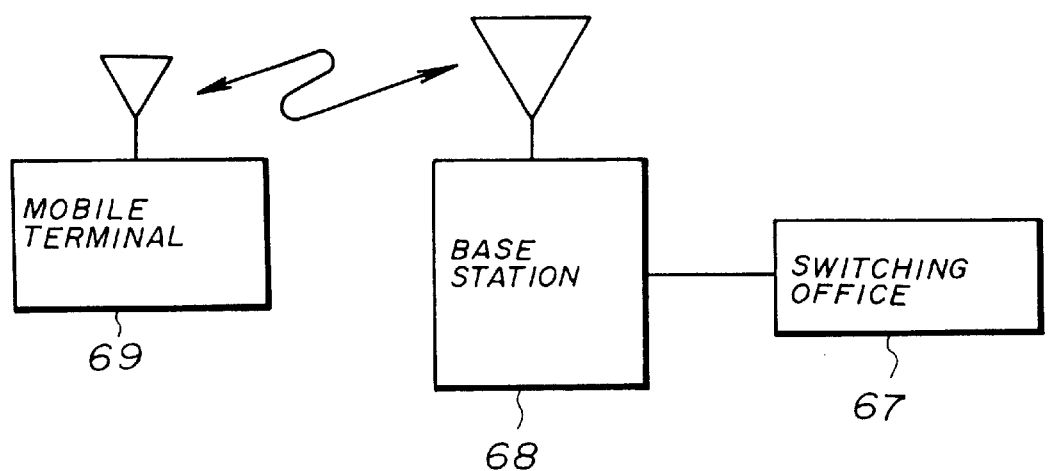
FIG. 9 shows a configuration example of a personal handyphone system (PHS)

The TG part 104 is connected to one of input terminals of the AND circuit 106 and one of input terminals of the CTF part 114, and generates a logic "1" at a timing of the B channel B93 shown in FIG. 4 to provide the logic "1" to the AND circuit 106 and the CTF part 114.

The TG part 105 is connected to one of input terminals of the AND circuit 107 and one of input terminals of the CTF part 115, and generates a logic "1" at a timing of the B channel B94 shown in FIG. 4 to provide the logic "1" to the AND circuit 107 and the CTF part 115.

In the T1 part 96, an input side of the T1 part 96 is connected to the CPU 26, and an output side thereof is connected to the other input terminal of the AND circuit 106, and respective control terminals of the PAT part 110, the CMP part 112, the CTF part 114, the CTU part 116, and the CTB part 118. When a logic "1" is written into the T1 part 96 by a control of the CPU 26, the T1 part 96 produces the logic "1" to the AND circuit 106, the PAT part 110, the CMP part 112, the CTF part 114, the CTU part 116, and the CTB part 118.

In the T2 part 97, an input side of the T2 part 97 is connected to the CPU 26, and an output side thereof is connected to the other input terminal of the AND circuit 107, and respective control terminals of the PAT part 111, the CMP part 113, the CTF part 115, the CTU part 117, and the CTB part 119. When a logic "1" is written into the T2 part 97 by a control of the CPU 26, the T2 part 97 produces the logic "1" to the AND circuit 107, the PAT part 111, the CMP part 113, the CTF part 115, the CTU part 117, and the CTB part 119.

In the AND circuit 106, an output side of the AND circuit 106 is connected to a selection control terminal of the SEL part 108. The AND circuit 106 processes an AND operation (logical multiplication) of the output data (logic "1" or "0") of the TG part 104 and the T1 part 96, and provides a processing result to the SEL part 108.

In the AND circuit 107, an output side of the AND circuit 107 is connected to a selection control terminal of the SEL part 109. The AND circuit 107 processes an AND operation (logical multiplication) of the output data (logic "1" or "0") of the TG part 105 and the T2 part 97, and provides a processing result to the SEL part 109.

In the SEL part 109, an input terminal of the SEL part 109 is connected to a B-channel output terminal of the selector part 94, one of output terminals of the SEL part 109 is connected to an input terminal of the SEL part 108, and the other of the output terminals thereof is connected to one of input terminals of the CMP part 113.

When a logic "0" produced from the AND circuit 107 is provided to the SEL part 109, the SEL part 109 provides the B channel produced from the selector part 94 to the SEL part 108. When a logic "1" produced from the AND circuit 107 is provided to the SEL part 109, the SEL part 109 provides the B channel produced from the selector part 94 to the CMP part 113.

In the SEL part 108, one of the output terminals of the SEL part 108 is connected to an input terminal of the DMPX part 95, and the other of the output terminals thereof is connected to one of the input terminals of the CMP part 112.

When a logic "0" produced from the AND circuit 106 is provided to the SEL part 108, the SEL part 108 provides the B channel produced from the SEL part 109 to the DMPX part 95. When a logic "1" produced from the AND circuit 106 is provided to the SEL part 108, the SEL part 108 provides the B channel produced from the SEL part 109 to the CMP part 112.

In the PAT part 110, an output side of the PAT part 110 is connected to the other of the input terminals of the CMP part 112. When a logic "1" produced from the T1 part 96 is provided to the PAT part 110, the PAT part 110 generates a reference random pattern signal for comparison which is the same as that generated in the PAT part 88 shown in FIG. 12, and provides the reference random pattern signal to the CMP part 112.

In the PAT part 111, an output side of the PAT part 111 is connected to the other of the input terminals of the CMP part 113. When a logic "1" produced from the T2 part 97 is provided to the PAT part 111, the PAT part 111 generates a reference random pattern signal for comparison which is the same as that generated in the PAT part 89 shown in FIG. 12, and provides the reference random pattern signal to the CMP part 113.

In the CMP part 112, an output side of the CMP part 112 is connected to the CTB part 118. The CMP part 112 compares the random pattern signal provided in the B channel B93 of the B channels which are produced from the SEL part 108 with the reference random pattern signal produced from the PAT part 110, and produces to the CTB part 118 bit errors in the B channel B93 which are obtained by detecting differences between the random pattern signal and the reference random pattern signal.

In this way, in response to a logic "1" produced from the TG part 104 at the timing of the B channel B93, the B channel B93 random signal is produced from the SEL part 108 to the CMP part 112. Therefore, the random pattern signal may be compared with the reference random pattern signal.

In the CTB part 118, an output terminal of the CTB part 118 is connected to an input terminal of the B1 part 100 and an input terminal of the IRC part 120. The CTB part 118 counts the number of bit errors in the B channel B93 produced from the CMP part 112, and produces a count result to the B1 part 100 and the IRC part 120.

In the B1 part 100, an output terminal of the B1 part 100 is connected to the CPU 26. The B1 part 100 stores the number B1 of bit errors in the B channel B93 produced from the CTB part 118, as shown in FIG. 15.

In the CMP part 113, an output side of the CMP part 113 is connected to the CTB part 119. The CMP part 113 compares the random pattern signal provided in the B channel B94 of the B channels which are produced from the SEL part 109 with the reference random pattern signal produced from the PAT part 111, and produces to the CTB part 119 bit errors in the B channel B94 which are obtained by detecting differences between the random pattern signal and the reference random pattern signal.

In this way, in response to a logic "1" produced from the TG part 105 at the timing of the B channel B94, the B channel B94 is produced from the SEL part 109 to the CMP part 113. Therefore, the random pattern signal may be compared with the reference random pattern signal.

In the CTB part 119, an output terminal of the CTB part 119 is connected to an input terminal of the B2 part 103 and an input terminal of the IRC part 120. The CTB part 119 counts the number of bit errors in the B channel B94 produced from the CMP part 113, and produces a count result to the B2 part 103 and the IRC part 120.

In the B2 part 103, an output terminal of the B2 part 103 is connected to the CPU 26. The B2 part 103 stores the number B2 of bit errors in the B channel B94 produced from the CTB part 119, as shown in FIG. 15.

In the CTU part 116, an input terminal of the CTU part 116 is connected to a UW93 output terminal of the selector part 94, and an output terminal thereof is connected to an input terminal of the U1 part 99 and an input terminal of the IRC part 120. The CTU part 116 detects the UW93 produced from the selector part 94. During the detection, the CTU part 116 counts the number of UW-undetections of the B channel B93 which corresponds to times when the UW93 is not detected, and produces the number to the U1 part 99 and the IRC part 120.

In the U1 part 99, an output terminal of the U1 part 99 is connected to the CPU 26. As shown in 15, the U1 part 99 stores the number U1 of UW-undetections of the B channel B93 produced from the CTU part 116.

In the CTF part 114, an output terminal of the CTF part 114 is connected to an input terminal of the F1 part 98 and an input terminal of the IRC part 120. When a logic "1" is produced from the T1 part 96, the CTF part 114 detects the logic "1" produced from the TG part 104 at the timing of the B channel B93, and counts the number of received frames of the B channel B93. After that, the CTF part 114 produces a count result to the F1 part 98 and the IRC part 120.

In the F1 part 98, an output terminal of the F1 part 98 is connected to the CPU 26. As shown in FIG. 15, the F1 part 98 stores the number F1 of received frames of the B channel B93 produced from the CTF part 114.

In the CTU part 117, an input terminal of the CTU part 117 is connected to a UW94 output terminal of the selector part 94, and an output terminal thereof is connected to an input terminal of the U2 part 102 and an input terminal of the IRC part 120. The CTU part 117 detects the UW94 produced from the selector part 94. During the detection, the CTU part 117 counts the number of UW-undetections of the B channel B94 which corresponds to times when the UW94 is not detected, and produces the number to the U2 part 102 and the IRC part 120.

In the U2 part 102, an output terminal of the U2 part 102 is connected to the CPU 26. As shown in 15, the U2 part 102 stores the number U2 of UW-undetections of the B channel B94 produced from the CTU part 117.

In the CTF part 115, an output terminal of the CTF part 115 is connected to an input terminal of the F2 part 101 and an input terminal of the IRC part 120. When the logic "1" is produced from the T2 part 97, the CTF part 115 detects the logic "1" produced from the TG part 105 at the timing of the B channel B94, and counts the number of received frames of the B channel B94. After that, the CTF part 115 produces a count result to the F2 part 101 and the IRC part 120.

In the F2 part 101, an output terminal of the F2 part 101 is connected to the CPU 26. As shown in FIG. 15, the F2 part 101 stores the number F2 of received frames of the B channel B94 produced from the CTF part 115.

In the IRC part 120, an output terminal of the IRC part 120 is connected to the CPU 26. The IRC part 120 produces an interruption signal to the CPU 26, when one 16-bit output data of outputs of the CTF parts 114, 115, the CTU parts 116, 117, and the CTB parts 118, 119, are all "1".

When the interruption signal is input to the CPU 26, the CPU 26 processes to stop the measurement by writing a logic "0" into the T1 part 96 and the T2 part 97. Further, the CPU 26 reads B1, U1, F1, B2, U2, and F2 respectively stored in the B1 part 100, the U1 part 99, the F1 part 98, the B2 part 103, the U2 part 102, and the F2 part 101, and calculates the BER.

Next, a description will be given of an operation of measuring the line quality in the above-discussed configuration.

In FIG. 11, a terminal-equipment number for measurement is provided from the MC part 36 to the TDMA equipment 11. For example, a telephone number "001" of the terminal equipment 12 and a telephone number "002" of the terminal equipment 12a are provided.

When these numbers are provided to the CPU 26, the CPU 26 transmits an instruction to loop back the B channel B93 to the terminal equipment 12 through the M channel, and transmits an instruction to loop back the B channel B94 to the terminal equipment 12a.

When the terminal equipment 12 receives the instruction from the CPU 26 in the TDMA equipment 11, the CPU 49 in the terminal equipment 12 transmits to the TDMA equipment 11 an acknowledge (ACK) which is a response for the loop-back instruction transmitted from the TDMA equipment 11 through the M channel. The terminal equipment 12a operates in the same way as the terminal equipment 12.

In the TDMA equipment 11, when the ACKs of responses for the loop-back instructions are received from the terminal equipment 12, 12a through the M part 30, the CPU 26 produces a selecting instruction for the random signals produced from the PAT part 88 and the PAT part 89 to the SEL part 90 and the SEL part 91 shown in FIG. 12. Namely, the CPU 26 provides a logic "1" to the T1 part 82 and the T2 part 83.

Further, in FIG. 12, by the timing signal "1" produced from the respective TG parts 84, 85 at the timing of the B channel B93 and the B channel B94, the respective random signals are provided in the B channel B93 and the B channel B94 of the down-link signal frame produced from the MPLX part 77, and are respectively transmitted to the terminal equipment 12, 12a.

In FIG. 11, the CPU 49 in the terminal equipment 12 transmits a B-channel control signal to the FRMD 41 through the BC part 47, and instructs the FRMD 41 to derive a B-channel signal from the B-channel B93. Further, the CPU 49 instructs the LB part 75 to loop back the B-channel signal, and, also, instructs the FRMA part 42 to provide the B-channel signal looped back from the LB part 75 to the B-channel B93.

In this way, the B-channel signal of the B channel B93 transmitted from the TDMA equipment 11 is returned back to the TDMA equipment 11 through the FRMD 41, the LB part 75, and the FRMA part 42. The terminal equipment 12a also operates in the same way as the terminal equipment 12.

Next, in the TDMA equipment 11, after one frame passes the CPU 26 instructs the SEL parts 108, 109 shown in FIG. 14 to derive the random signals from the B channels B93, B94 transmitted from the terminal equipment 12, 12a. This instruction is carried out by writing a logic "1" to the T1 part 96 and the T2 part 97.

At this time, the CTF parts 114, 115, the CTU parts 116, 117, and the CTB parts 118, 119, which are respectively a 16-bit counter, are cleared, and the PAT parts 110, 111 are initialized.

In FIG. 14, after the selector part 94 detects the UW93 and the UW94, the selector part 94 distributes the B, M, D channels according to an instruction from the selector control part 93. The UW93 and the UW94 are results of the UW detection in the B channel B93 and the B channel B94. The CTU parts 116, 117 count the numbers U1, U2 of UW-undetections in the B channels B93, B94 by detecting the results of the UW detection, and respectively provide U1 and U2 to the U1 part 99 and the U2 part 102.

While the T1 part 96 and the T2 part 97 store a logic "1", the CTF parts 114, 115 count the number F1, F2 of the received frames in the B channels B93, B94, and respectively provide F1 and F2 to the F1 part 98 and the F2 part 101.

The CMP parts 112, 113 compare the random signals respectively transmitted from the SEL parts 108, 109 with the reference random signals produced from the PAT parts 110, 111 to measure the line quality. As a result of comparison, when there are unmatched bits between the random pattern signal and the reference random pattern signal, the CTB parts 118, 119 count the numbers B1, B2 of bit errors in the B channels B93, B94, and respectively provides B1 and B2 to the B1 part 100 and the B2 part 103.

The IRC part 120 then produces an interruption signal to the CPU 26, when one 16-bit output data of outputs of the CTF parts 114, 115, the CTU parts 116, 117, and the CTB parts 118, 119, are all "1".

When the interruption signal is input to the CPU 26, the CPU 26 stops the measurement by writing a logic "0" into the T1 part 96 and the T2 part 97. Further, the CPU 26 reads B1, U1, F1, B2, U2, and F2 respectively stored in the B1 part 100, the U1 part 99, the F1 part 98, the B2 part 103, the U2 part 102, and the F2 part 101, and calculates the BER.

The BER is calculated by the following equation:

BER=(the number $B1$ or $B2$ of bit errors)/[256 bits/frame×(the number $F1$ or $F2$ of received frames×the number $U1$ or $U2$ of UW-undetections)]

After the CPU 26 calculates the BER, the CPU 26 provides the calculated BERs corresponding to the terminal-equipment numbers "001" and "002" for the measurement, a measurement start time, and a measurement finished time, to the MC part 36.

As discussed above, a typical operation of the first embodiment of the communication-line-quality measuring system according to the present invention have been described.

However, even during the line-quality measurement, the terminal equipment 12, 12a need to be available for a conventional communication. Therefore, in the following five cases, the CPU 26 instructs the terminal equipment 12, 12a, the SEL part 90, the SEL part 91, the SEL part 108, and the SEL part 109, to temporarily stop the measurement.

A first case is that the telephones 13, 13a connected to the terminal equipment 12, 12a are taken off of the hook. In this case, off-hook information is transmitted from the terminal equipment 12, 12a to the TDMA equipment 11 through the D2 channel. Therefore, the CPU 26 soon stops the line-quality measurement, and carries out a normal call processing control. After the call is finished, the CPU 26 automatically starts the line-quality measurement, and goes on measuring.

A second case is that a call is transmitted from the switching system 10 to the terminal equipment 12, 12a. In this case, call-terminating information is transmitted from the switching system 10 to the TDMA equipment 11 through the D1 channel. Therefore, the CPU 26 soon stops the line-quality measurement, and carries out the normal call processing control. After the call is finished, the CPU 26 automatically starts the line-quality measurement, and goes on measuring.

A third case is that an instruction of notification broadcasting is produced from the switching system 10 to the terminal equipment 12, 12a. In this case, the notification broadcasting information is transmitted from the switching system 10 to the TDMA equipment 11 through the D1 channel. Therefore, the CPU 26 soon stops the line-quality measurement, and carries out the normal call processing control. After the notification broadcasting is finished, the CPU 26 automatically starts the line-quality measurement, and goes on measuring.

A fourth case is that an instruction of paging is transmitted from the switching system 10 to the terminal equipment 12, 12a. In this case, the paging information is transmitted from the switching system 10 to the TDMA equipment 11 through the D1 channel. Therefore, the CPU 26 soon stops the line-quality measurement, and carries out the normal call processing control. After the paging is finished, the CPU 26 automatically starts the line-quality measurement, and goes on measuring.

A fifth case is that an instruction of simultaneous broadcasting is transmitted from the switching system 10 to the terminal equipment 12, 12a. In this case, the simultaneous broadcasting information is transmitted from the switching system 10 to the TDMA equipment 11 through the D1 channel. Therefore, the CPU 26 soon stops the line-quality measurement, and carries out the normal call processing control. After the simultaneous broadcasting is finished, the CPU 26 automatically starts the line-quality measurement, and goes on measuring.

By processing the above-discussed operations, the line-quality measurement may be carried out without influencing the normal calling and terminating operations.

Figure 16:
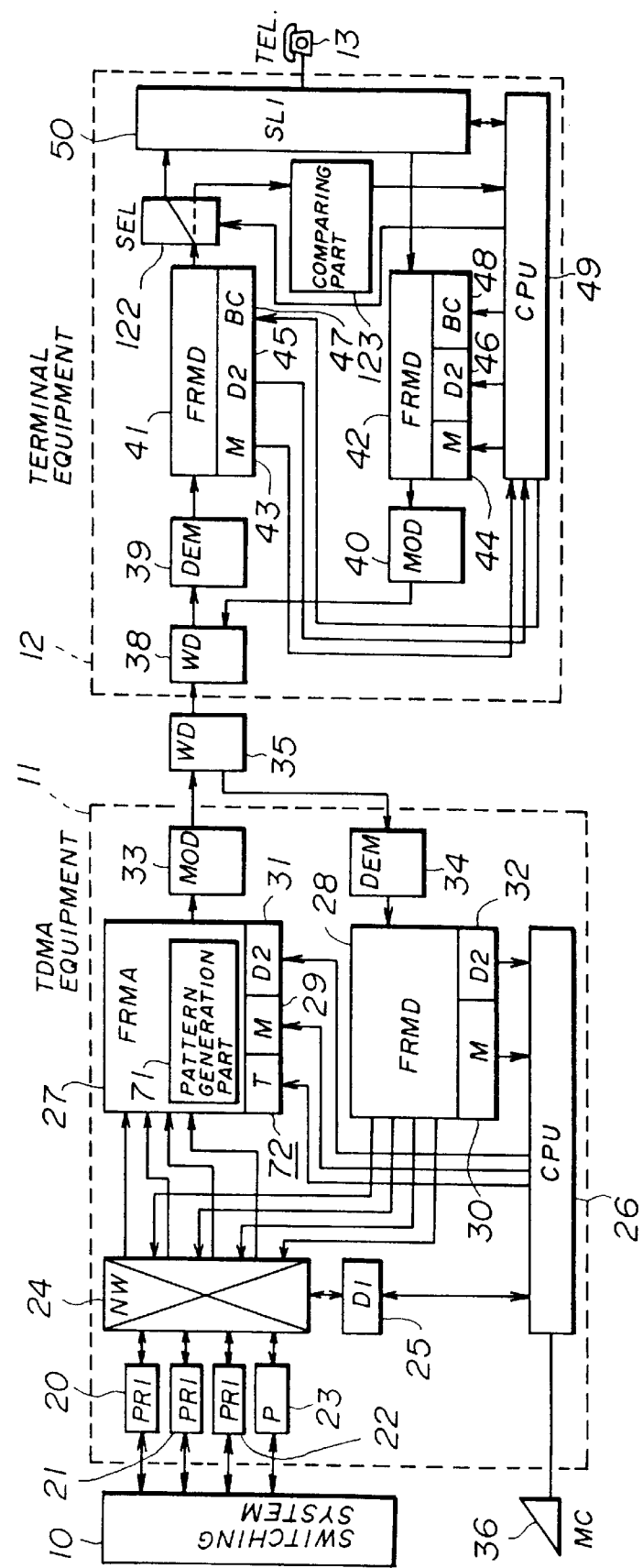
FIG. 16 shows a block diagram of a two-way CATV system supplying a telephone service to which a second embodiment of the communication-line-quality measuring system according to the present invention is applied.

Next, a description will be given of a second embodiment of the communication-line-quality measuring system according to the present invention, by referring to FIG. 16. FIG. 16 shows a block diagram of a two-way CATV system supplying a telephone service to which the second embodiment of the communication-line-quality measuring system according to the present invention is applied. Elements in FIG. 16 which are the same as those of FIG. 11 are given the same reference numerals.

The second embodiment of the communication-line-quality measuring system has a configuration for measuring only line quality of the down-link line. In the second embodiment, as compared to the system shown in FIG. 11, the comparing part 73 and the T part 74 are eliminated from the TDMA equipment 11, and a SEL part 122 and a comparing part 123 are provided in the terminal equipment 12.

Further, the pattern generation part 71 is constituted so as to provide the random pattern signal to the later-discussed dedicated channel. The above constitution may be realized by operating the TG part 84 shown in FIG. 12 to produce a logic "1" at a timing of the dedicated channel, instead of operating the TG part 84 to produce the logic "1" at the timing of the B channel B93.

Further, if the TG part 85 is operated to produce a logic "1" at a timing of another dedicated channel instead of producing the logic "1" at the timing of the B channel B94, the down-link line-quality for two terminal equipment may be measured.

In the SEL part 122, an input terminal of the SEL part 122 is connected to the output terminal of the FRMD 41, and one of the output terminals of the SEL part 122 is connected to the input terminal of the SLI part 50. In the comparing part 123, an input terminal of the comparing part 123 is connected to the other one of the output terminals of the SEL part 122, and an output terminal of the comparing part 123 is connected to the CPU 49.

FIG. 17 shows a frame structure of a down-link signal including the dedicated channel for the line-quality measurement. In the frame structure of the down-link signal shown in FIG. 17, available channels of the M channels and the D channels shown in FIG. 3 are used for the dedicated channels TO represented by a numeral "125".

In this case, the CPU 26 transmits an instruction of starting a comparison to the terminal equipment 12 through the M channel. When the CPU 49 in the terminal equipment 12 receives that instruction, the CPU 49 controls the SEL part 122 to transmit the random pattern signal provided in the dedicated channel to the comparing part 123.

The comparing part 123 compares the random pattern signal with the reference random pattern signal. The comparison result is transmitted to the TDMA equipment 11 by the CPU 49, and is provided to the MC part 36 by the CPU 26.

Also, in the second embodiment, operations for interruption and re-start of the line-quality measurement are the same as those in the first embodiment.

Figure 18:
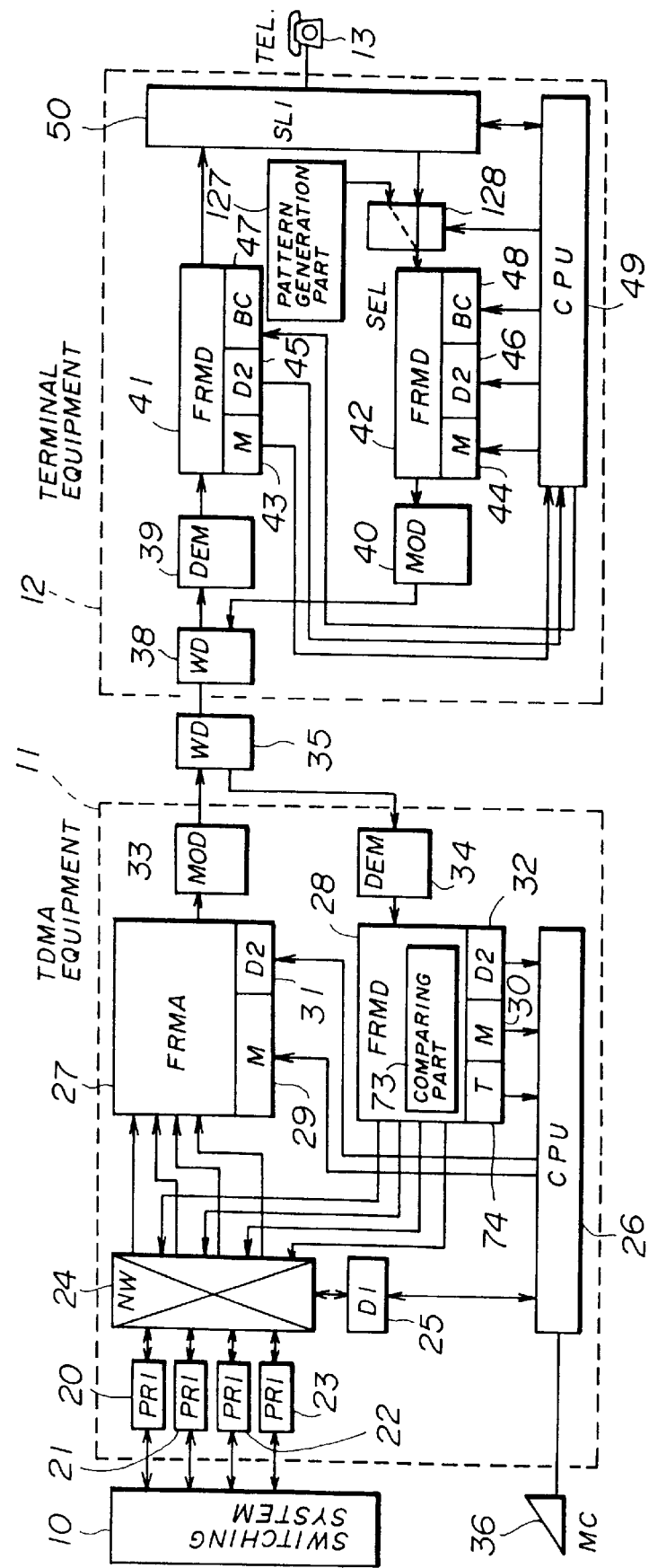
FIG. 18 shows a block diagram of a two-way CATV system supplying a telephone service to which a third embodiment of the communication-line-quality measuring system according to the present invention is applied.

Next, a description will be given of a third embodiment of the communication-line-quality measuring system according to the present invention, by referring to FIG. 18. FIG. 18 shows a block diagram of a two-way CATV system supplying a telephone service to which the third embodiment of the communication-line-quality measuring system according to the present invention is applied. Elements in FIG. 18 which are the same as those of FIG. 11 are given the same reference numerals.

The third embodiment of the communication-line-quality measuring system has a configuration for measuring only line quality of the up-link line. In the third embodiment, as compared to the first embodiment of the system shown in FIG. 11, the pattern generation part 71 and the T part 72 are eliminated from the TDMA equipment 11, and a pattern generation part 127 and a SEL part 128 are provided in the terminal equipment 12.

The comparing part 73 is constituted so as to compare the random pattern signal provided in a later-discussed dedicated channel with the reference random pattern signal. The above constitution may be realized by operating the TG part 104 shown in FIG. 14 to produce a logic "1" at a timing of the dedicated channel, instead of operating the TG part 104 to produce the logic "1" at the timing of the B channel B93.

Further, if the TG part 105 is operated to produce a logic "1" at a timing of another dedicated channel instead of producing the logic "1" at the timing of the B channel B94, the up-link line-quality from two terminal equipment may be measured.

An input terminal of the pattern generation part 127 generating the random pattern signal is connected to one of input terminals of the SEL part 128. The other one of the input terminals of the SEL part 128 is the output terminal of the SLI part 50, and an output terminal of the SEL part 128 is connected to the input of the FRMA part 42.

Figure 19A:
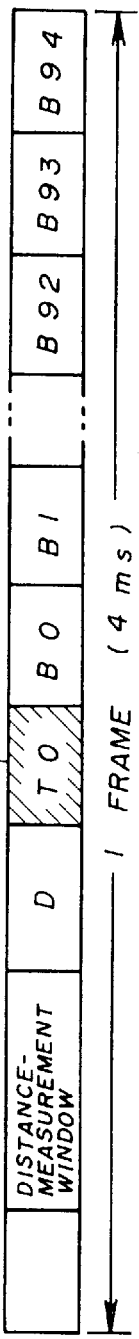
FIG. 19A to FIG. 19C show illustrations for explaining the dedicated channel for transmitting the random signal.
Figure 19B:
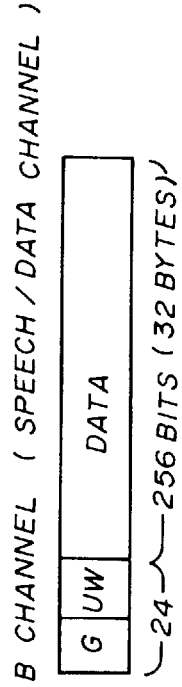
Figure 19C:
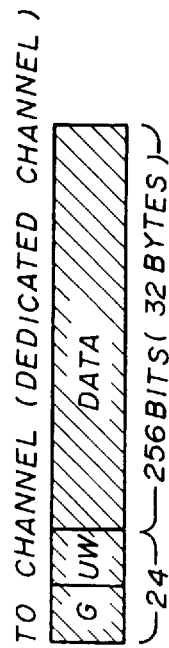

FIG. 19A to FIG. 19C show illustrations for explaining the dedicated channel for transmitting the random pattern signal. FIG. 19A shows one frame structure including the dedicated channel, FIG. 19B shows a structure of the typical B channel, and FIG. 19C shows a structure of the dedicated channel.

As shown in FIG. 19A, the dedicated channel is set to an available one of the frames of the D channel, and is represented by a symbol "TO". Further, as shown in FIG. 19B and FIG. 19C, the dedicated channel TO has the same structure as that of the B channel.

In the above-discussed configuration, the CPU 26 transmits an instruction of starting a comparison to the terminal equipment 12 through the M channel. When the CPU 49 in the terminal equipment 12 receives that instruction, the CPU 49 controls the SEL part 128 to select the random pattern signal generated in the pattern generation part 127.

Further, the random pattern signal provided in the dedicated channel TO is transmitted to the comparing part 73 in the TDMA equipment 11. The comparing part 73 compares the random pattern signal with the reference random pattern signal, and produces the comparison result to the MC part 36.

Also, in the third embodiment, operations for interruption and re-start of the line-quality measurement are the same as those in the first embodiment.

In the above-discussed second and third embodiments, the D channel is used for the dedicated channel. It should be noted that the B channel may also used for the dedicated channel. Further, in the first embodiment also, the dedicated channel may be used.

As described above, the present inventions have the following features.

Since the pattern generation part and the comparing part are provided in the TDMA equipment 11, the line-quality measurement may easily be carried out. Further, since the line-quality measurement is carried out by operating only the MC part 36, cost for the line-quality measurement may be extremely reduced.

Since the terminal equipment to be measured is selected through the M channel, the line-quality measurement for many terminal equipment may be carried out in a shorter time.

Since for providing the random pattern signal, all channels are not used, but one B channel or a dedicated channel is used, the remaining terminal equipment except the terminal equipment to be measured may be supplied with normal communication services. Further, when the terminal equipment being measured is used for the normal communication service, the line-quality measurement for that terminal equipment is temporarily stopped. Therefore, the line-quality measurement may be carried out without influencing the normal communication services in the terminal equipment.

In the system according to the present invention, the specified pattern is not transmitted using all the channels, but the specified pattern is transmitted using only the B channel or the dedicated channel. Therefore, the line quality of the communication line being in practical use may be precisely measured.

Further, the present invention is not limited to these embodiments, but other variations and modifications may be made without departing from the scope of the present invention.

What is claimed is:

1. A communication-line-quality measuring system comprising:
    transmission equipment having:
        first frame assembling means for transmitting a down-link multiplexed frame signal to a down-link line having a first frequency; and
        first frame disassembling means for disassembling an up-link multiplexed frame signal transmitted through an up-link line having a second frequency;
    terminal equipment having:
        second frame disassembling means for disassembling said down-link multiplexed frame signal; and
        second frame assembling means for transmitting said up-link multiplexed frame signal which is obtained by frame-multiplexing an output signal of said subscriber unit with a control signal, to said up-link line;
    pattern generation means, provided in said first frame assembling means, for providing a test signal to an available channel of signal frames in said down-link multiplexed frame signal;
    loop-back means, provided between said second frame disassembling means and said second frame assembling means, for looping back the test signal derived from said down-link multiplexed frame signal in said second frame disassembling means to said second frame assembling means so that said second frame assembling means provides the test signal in said up-link multiplexed frame signal to transmit to said transmission equipment; and
    comparing means, provided in said transmission equipment, for comparing the test signal provided in said up-link multiplexed frame signal which is looped back by a control of said loop-back means with a reference signal which is the same as said test signal generated in said pattern generation means.

2. The system as claimed in claim 1, wherein said pattern generation means provides said test signal to an available channel of control-signal frames of said signal frames in said down-link multiplexed frame signal.

3. The system as claimed in claim 2, wherein said control-signal frames have a dedicated channel for said test signal, and said pattern generation means provides said test signal to said dedicated channel as the available channel.

4. The system as claimed in claim 1, wherein:
    said transmission equipment comprises a first CPU providing an instruction for looping back the test signal to an available channel of control-signal frames of said signal frames in said down-link multiplexed frame signal, and transmitting said instruction to terminal equipment designated by a terminal-equipment number provided from an input means;
    said terminal equipment comprises a second CPU providing an acknowledgement to an available channel of control-signal frames of signal frames in said up-link multiplexed frame signal toward said transmission equipment in response to said instruction for looping back the test signal transmitted from said first CPU; and
    said first CPU instructs said pattern generation means to provide said test signal to said down-link multiplexed frame signal in response to reception of said acknowledgement from said second CPU.

5. The system as claimed in claim 1, wherein:
    said pattern generation means generates a plurality of different test signals, and respectively provides said plurality of different test signals to different available channels of the signal frames in said down-link multiplexed frame signal, and transmits said down-link multiplexed frame signal to a plurality of terminal equipment; and
    said comparing means generates a plurality of different reference signals which are the same as said plurality of different test signals generated in said pattern generation means, and respectively compares a plurality of different test signals looped back from said plurality of terminal equipment through said up-link multiplexed frame signals with said different reference signals.

6. The system as claimed in claim 4, wherein said comparing means comprises:
    bit error counting (CTB) means for counting the number of bit errors obtained by comparing the test signal looped back from said terminal equipment through said up-link multiplexed frame signal with said reference signal;
    unique word undetection counting (CTU) means for detecting unique words in said up-link multiplexed frame signal, and counting the number of unique-word undetections which is the number of times that the unique word is not detected;
    frame detection counting (CTF) means for counting the number of received frames in said up-link multiplexed frame signal; and
    storage means for storing said number of bit errors, said number of unique-word undetections, and said number of received frames.

7. The system as claimed in claim 6, wherein:

said comparing means comprises interruption generating (IRC) means for producing an interruption signal to said first CPU when one of said number of bit errors, said number of unique-word undetections, and said number of received frames, exceeds a predetermined value; and when said interruption signal is input to said first CPU, the first CPU reads said number of bit errors, said number of unique-word undetections, and said number of received frames stored in said storage means to calculate a bit error rate, and produces a calculation result to a display means.

8. The system as claimed in claim 7, wherein said bit error rate BER is calculated by the following equation:

BER=(said number of bit errors)/[the number of bits in one frame×(said number of received frames−said number of unique-word undetections)].

9. The system as claimed in claim 7, wherein said first CPU stops a comparing operation of said comparing means when said interruption signal is input to said first CPU.

10. The system as claimed in claim 6, wherein said first CPU resets count values of said CTB means, said CTU means, and said CTF means when an instruction for a comparing operation is input from said input means to said first CPU.

11. The system as claimed in claim 4, wherein:

when said terminal equipment calls, said second CPU provides calling information to an available channel of the control-signal frames in said up-link multiplexed frame signal to transmit said calling information to said first CPU; and when said first CPU receives said calling information, said first CPU stops operations of said pattern generation means and said comparing means in order to stop line-quality measurement.

12. The system as claimed in claim 11, wherein said first CPU re-starts the line-quality measurement when a call of the terminal equipment is finished.

13. The system as claimed in claim 4, wherein:

when a call is terminated from a switching system to said terminal equipment, said first CPU provides call-terminating information to an available channel of the control-signal frames in said down-link multiplexed frame signal to transmit said call-terminating information to said second CPU, and stops line-quality measurement; and when said second CPU receives said call-terminating information, said second CPU stops a loop-back control of said loop-back means.

14. The system as claimed in claim 13, wherein said first CPU re-starts the line-quality measurement when a terminated call of the terminal equipment is finished.

15. The system as claimed in claim 4, wherein:

when an instruction for notification broadcasting is produced from a switching system to said terminal equipment, said first CPU provides notification broadcasting information to an available channel of the control-signal frames in said down-link multiplexed frame signal to transmit said terminating information to said second CPU, and stops line-quality measurement; and when said second CPU receives said notification broadcasting information, said second CPU stops a loop-back control of said loop-back means.

16. The system as claimed in claim 15, wherein said first CPU re-starts the line-quality measurement when said notification broadcasting is finished.

17. The system as claimed in claim 4, wherein:

when an instruction for paging is produced from a switching system to said terminal equipment, said first CPU provides paging information to an available channel of the control-signal frames in said down-link multiplexed frame signal to transmit terminating information to said second CPU, and stops line-quality measurement; and when said second CPU receives said paging information, said second CPU stops a loop-back control of said loop-back means.

18. The system as claimed in claim 17, wherein said first CPU re-starts the line-quality measurement when said paging is finished.

19. The system as claimed in claim 4, wherein:

when an instruction for simultaneous broadcasting is produced from a switching system to said terminal equipment, said first CPU provides simultaneous broadcasting information to an available channel of the control-signal frames in said down-link multiplexed frame signal to transmit terminating information to said second CPU, and stops line-quality measurement; and when said second CPU receives said simultaneous broadcasting information, said second CPU stops a loop-back control of said loop-back means.

20. The system as claimed in claim 19, wherein said first CPU re-starts the line-quality measurement when said simultaneous broadcasting is finished.

21. A communication-line-quality measuring system comprising:

transmission equipment having:
first frame assembling means for transmitting a down-link multiplexed frame signal to a down-link line having a first frequency; and
first frame disassembling means for disassembling an up-link multiplexed frame signal transmitted through an up-link line having a second frequency;

terminal equipment having:
second frame disassembling means for disassembling said down-link multiplexed frame signal; and
second frame assembling means for transmitting said up-link multiplexed frame signal which is obtained by frame-multiplexing an output signal of said subscriber unit with a control signal, to said up-link line;

pattern generation means, provided in said first frame assembling means, for providing a test signal to an available channel of signal frames in said down-link multiplexed frame signal; and comparing means, provided in said terminal equipment, for comparing the test signal derived from said down-link multiplexed frame signal in said second frame disassembling means with a reference signal which is the same as said test signal generated in said pattern generation means.

22. The system as claimed in claim 21, wherein:

said transmission equipment comprises a first CPU;

said terminal equipment comprises a second CPU providing a comparison result obtained in said comparing means to an available channel of control-signal frames of signal frames in said up-link multiplexed frame signal to transmit the comparison result to said first CPU;

when said first CPU receives said comparison result, the first CPU displays the comparison result to a display means.

23. The system as claimed in claim 21, wherein said pattern generation means provide said test signal to an available channel of control-signal frames of said signal frames in said down-link multiplexed frame signal.

24. The system as claimed in claim 23, wherein said control-signal frames have a dedicated channel for said test signal, and said pattern generation means provides said test signal to said dedicated channel as the available channel.

25. The system as claimed in claim 21, wherein:
said transmission equipment comprises a first CPU providing an instruction for a comparing operation to an available channel of control-signal frames of said signal frames in said down-link multiplexed frame signal, and transmitting said instruction to terminal equipment designated by an input means;
said terminal equipment comprises a second CPU instructing said comparing means to carry out the comparing operation when the second CPU receives said instruction of said comparing operation.

26. The system as claimed in claim 21, wherein:
said pattern generation means generates a plurality of different test signals, and respectively provides said plurality of different test signals to different available channels of the signal frames in said down-link multiplexed frame signal, and transmits said down-link multiplexed frame signal to a plurality of terminal equipment; and
said comparing means generates a plurality of different reference signals which are the same as said plurality of different test signals generated in said pattern generation means, and respectively compares a plurality of different test signals with said different reference signals.

27. The system as claimed in claim 25, wherein:
when said terminal equipment calls, said second CPU provides calling information to an available channel of the control-signal frames in said up-link multiplexed frame signal to transmit said calling information to said first CPU; and
when said first CPU receives said calling information, said first CPU stops an operation of said pattern generation means, and said second CPU stops a comparing operation of said comparing means in order to stop line-quality measurement.

28. The system as claimed in claim 27, wherein said first CPU and said second CPU re-start the line-quality measurement when a call of the terminal equipment is finished.

29. The system as claimed in claim 25, wherein:
when a call is terminated from a switching system to said terminal equipment, said first CPU provides call-terminating information to an available channel of the control-signal frames in said down-link multiplexed frame signal to transmit said call-terminating information to said second CPU, and stops an operation of said pattern generation means; and
when said second CPU receives said call-terminating information, said second CPU stops a comparing operation of said comparing means in order to stop line-quality measurement.

30. The system as claimed in claim 29, wherein said first CPU and said second CPU re-start the line-quality measurement when a terminated call of the terminal equipment is finished.

31. The system as claimed in claim 25, wherein:
when an instruction for notification broadcasting is produced from a switching system to said terminal equipment, said first CPU provides notification broadcasting information to an available channel of the control-signal frames in said down-link multiplexed frame signal to transmit said terminating information to said second CPU, and stops an operation of said pattern generation means; and
when said second CPU receives said notification broadcasting information, said second CPU stops a comparing operation of said comparing means in order to stop line-quality measurement.

32. The system as claimed in claim 31, wherein said first CPU and said second CPU re-start the line-quality measurement when said notification broadcasting is finished.

33. The system as claimed in claim 25, wherein:
when an instruction for paging is produced from a switching system to said terminal equipment, said first CPU provides paging information to an available channel of the control-signal frames in said down-link multiplexed frame signal to transmit terminating information to said second CPU, and stops an operation of said pattern generation means; and
when said second CPU receives said paging information, said second CPU stops a comparing operation of said comparing means in order to stop line-quality measurement.

34. The system as claimed in claim 33, wherein said first CPU and said second CPU re-start the line-quality measurement when said paging is finished.

35. The system as claimed in claim 25, wherein:
when an instruction for simultaneous broadcasting is produced from a switching system to said terminal equipment, said first CPU provides simultaneous broadcasting information to an available channel of the control-signal frames in said down-link multiplexed frame signal to transmit terminating information to said second CPU, and stops an operation of said pattern generation means; and
when said second CPU receives said simultaneous broadcasting information, said second CPU stops a comparing operation of said comparing means in order to stop line-quality measurement.

36. The system as claimed in claim 35, wherein said first CPU and said second CPU re-start the line-quality measurement when said simultaneous broadcasting is finished.

37. A communication-line-quality measuring system comprising:
transmission equipment having:
first frame assembling means for transmitting a down-link multiplexed frame signal to a down-link line having a first frequency; and
first frame disassembling means for disassembling an up-link multiplexed frame signal transmitted through an up-link line having a second frequency;
terminal equipment having:
second frame disassembling means for disassembling said down-link multiplexed frame signal; and
second frame assembling means for transmitting said up-link multiplexed frame signal which is obtained by frame-multiplexing an output signal of said subscriber unit with a control signal, to said up-link line;
pattern generation means, provided in said terminal equipment so as to connect with said second frame assembling means, for providing a test signal to an available channel of signal frames in said up-link multiplexed frame signal;
comparing means, provided in said transmission equipment, for comparing the test signal derived from said up-link multiplexed frame signal in said first frame disassembling means with a reference signal which is the same as said test signal generated in said pattern generation means.

38. The system as claimed in claim 37, wherein said pattern generation means provides said test signal to an available channel of control-signal frames of said signal frames in said up-link multiplexed frame signal.

39. The system as claimed in claim 38, wherein said control-signal frames have a dedicated channel for said test signal, and said pattern generation means provides said test signal to said dedicated channel as the available channel.

40. The system as claimed in claim 37, wherein:

said transmission equipment comprises a first CPU providing an instruction for a comparing operation to an available channel of control-signal frames of signal frames in said down-link multiplexed frame signal, and transmitting said instruction to terminal equipment designated by an input means;

said terminal equipment comprises a second CPU instructing said pattern generation means to carry out a providing operation of said test signal when the second CPU receives said instruction of said comparing operation.

41. The system as claimed in claim 40, wherein:

when said terminal equipment calls, said second CPU provides calling information to an available channel of the control-signal frames in said up-link multiplexed frame signal to transmit said calling information to said first CPU; and when said first CPU receives said calling information, said first CPU stops a comparing operation of said comparing means, and said second CPU stops an operation of said pattern generation means in order to stop line-quality measurement.

42. The system as claimed in claim 41, wherein said first CPU and said second CPU re-start the line-quality measurement when a call of the terminal equipment is finished.

43. The system as claimed in claim 25, wherein:

when a call is terminated from a switching system to said terminal equipment, said first CPU provides call-terminating information to an available channel of the control-signal frames in said down-link multiplexed frame signal to transmit said call-terminating information to said second CPU, and stops a comparing operation of said comparing means; and when said second CPU receives said call-terminating information, said second CPU stops an operation of said pattern generation means in order to stop line-quality measurement.

44. The system as claimed in claim 43, wherein said first CPU and said second CPU re-start the line-quality measurement when a terminated call of the terminal equipment is finished.

45. The system as claimed in claim 40, wherein:

when an instruction for notification broadcasting is produced from a switching system to said terminal equipment, said first CPU provides notification broadcasting information to an available channel of the control-signal frames in said down-link multiplexed frame signal to transmit said terminating information to said second CPU, and stops a comparing operation of said comparing means; and when said second CPU receives said notification broadcasting information, said second CPU stops an operation of said pattern generation means in order to stop line-quality measurement.

46. The system as claimed in claim 45, wherein said first CPU and said second CPU re-start the line-quality measurement when said notification broadcasting is finished.

47. The system as claimed in claim 40, wherein:

when an instruction for paging is produced from a switching system to said terminal equipment, said first CPU provides paging information to an available channel of the control-signal frames in said down-link multiplexed frame signal to transmit terminating information to said second CPU, and stops a comparing operation of said comparing means; and when said second CPU receives said paging information, said second CPU stops an operation of said pattern generation means in order to stop line-quality measurement.

48. The system as claimed in claim 47, wherein said first CPU and said second CPU re-start the line-quality measurement when said paging is finished.

49. The system as claimed in claim 40, wherein:

when an instruction for simultaneous broadcasting is produced from a switching system to said terminal equipment, said first CPU provides simultaneous broadcasting information to an available channel of the control-signal frames in said down-link multiplexed frame signal to transmit terminating information to said second CPU, and stops a comparing operation of said comparing means; and when said second CPU receives said simultaneous broadcasting information, said second CPU stops an operation of said pattern generation means in order to stop line-quality measurement.

50. The system as claimed in claim 49, wherein said first CPU and said second CPU re-start the line-quality measurement when said simultaneous broadcasting is finished.

* * * * *